(12) United States Patent
Toksoz et al.

(10) Patent No.: US 11,068,290 B2
(45) Date of Patent: Jul. 20, 2021

(54) SYSTEMS AND METHODS FOR PROVIDING INTERACTIVE STREAMING MEDIA

(71) Applicant: GOOGLE LLC, Mountain View, CA (US)

(72) Inventors: Tuna Toksoz, Mountain View, CA (US); Thomas Price, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/818,340

(22) Filed: Mar. 13, 2020

(65) Prior Publication Data

US 2020/0218554 A1 Jul. 9, 2020

Related U.S. Application Data

(60) Division of application No. 15/765,179, filed as application No. PCT/US2017/061399 on Nov. 13, (Continued)

(51) Int. Cl.
*G06F 9/455* (2018.01)
*G06F 9/48* (2006.01)
*G06F 9/451* (2018.01)

(52) U.S. Cl.
CPC .......... *G06F 9/45504* (2013.01); *G06F 9/452* (2018.02); *G06F 9/45558* (2013.01); *G06F 9/485* (2013.01); *G06F 2009/45575* (2013.01)

(58) Field of Classification Search
CPC .......... H04N 21/8166; H04N 21/4781; H04N 21/6587; A63F 2300/535; A63F 13/355;
(Continued)

(56) References Cited

U.S. PATENT DOCUMENTS

2010/0325278 A1 12/2010 Heim et al.
2013/0117769 A1* 5/2013 Sharma .................. G06F 1/3293
719/328
(Continued)

FOREIGN PATENT DOCUMENTS

CN 101087404 A 12/2007
CN 102968737 A 3/2013
(Continued)

OTHER PUBLICATIONS

International Preliminary Report on Patentability for PCT Appln. Ser. No. PCT/US2016/061924 dated May 23, 2019 (10 pages).
(Continued)

*Primary Examiner* — Tonia L Dollinger
*Assistant Examiner* — Joseph M Cousins
(74) *Attorney, Agent, or Firm* — Foley & Lardner LLP

(57) ABSTRACT

A client system presents, within an execution environment of an application, a third-party media stream distinct from the application, received from a remote host server via a network. The client system detects interaction events during presentation of the third-party media stream, and transmits descriptions of the detected interaction events to the remote host server. The application may be pre-cued prior to presentation, e.g., to minimize start-up time. In some implementations, a side-band message channel is established to facilitate communication between the client system and the remote host server.

18 Claims, 10 Drawing Sheets

Related U.S. Application Data 2017, now abandoned, which is a continuation of application No. PCT/US2016/061924, filed on Nov. 14, 2016.

(58) Field of Classification Search
CPC . A63F 13/49; G06K 2209/01; H04L 65/4084; H04L 65/602
See application file for complete search history.

(56) References Cited

U.S. PATENT DOCUMENTS

| | | |
|---|---|---|
| 2014/0245294 A1 | 8/2014 | Kaul |
| 2014/0366024 A1* | 12/2014 | Chinnamani ....... G06F 9/45545 718/1 |
| 2015/0006761 A1* | 1/2015 | Miller ..................... G06F 21/52 710/3 |
| 2015/0057084 A1 | 2/2015 | Lin et al. |
| 2016/0055017 A1 | 2/2016 | Beveridge et al. |
| 2016/0080474 A1* | 3/2016 | Argenti .................. H04L 43/10 709/201 |
| 2016/0182954 A1 | 6/2016 | Nguyen et al. |
| 2016/0266915 A1* | 9/2016 | Morelli ................... H04L 67/42 |
| 2017/0087464 A1* | 3/2017 | Perry ..................... A63F 13/497 |
| 2017/0177559 A1 | 6/2017 | Dang et al. |
| 2017/0228263 A1* | 8/2017 | Seitz ..................... G06F 9/4411 |
| 2017/0317948 A1* | 11/2017 | Ilaiwi ....................... G06F 8/36 |

FOREIGN PATENT DOCUMENTS

| | | |
|---|---|---|
| CN | 104038473 A | 9/2014 |
| JP | 2010-533901 | 10/2010 |
| WO | WO-2012/154361 A1 | 11/2012 |

OTHER PUBLICATIONS

International Preliminary Report on Patentability for PCT Appln. Ser. No. PCT/US2017/061399 dated May 23, 2019 (8 pages).
International Search Report and Written Opinion for PCT Appln. Ser. No. PCT/US2016/061924 dated Jul. 18, 2017 (15 pages).
International Search Report and Written Opinion for PCT Appln. Ser. No. PCT/US2017/061399 dated Mar. 7, 2018 (13 pages).
Non-Final Office Action for U.S. Appl. No. 15/765,179 dated Sep. 12, 2019 (20 pages).
Office Action for KR Appln. Ser. No. 10-2018-7009569 dated Apr. 1, 2019 (13 pages).
Examination Report for IN Appln. Ser. No. 201847012910 dated Oct. 16, 2020 (6 pages).
First Office Action for CN Appln. Ser. No. 201780003445.7 dated Oct. 12, 2020 (27 pages).
Second Office Action for CN Appln. Ser. No. 201780003445.7 dated Apr. 26, 2021 (33 pages).

* cited by examiner

SYSTEMS AND METHODS FOR PROVIDING INTERACTIVE STREAMING MEDIA

CROSS-REFERENCE TO RELATED APPLICATIONS

The present application is a divisional of and claims the benefit of and priority to U.S. patent application Ser. No. 15/765,179, entitled "Systems and Methods for Providing Interactive Streaming Media," filed Mar. 30, 2018, which itself claims the benefit of and priority to Patent Cooperation Treaty Application No. PCT/2017/061399, entitled "Systems and Methods for Providing Interactive Streaming Media," filed Nov. 13, 2017, which itself claims the benefit of and priority to Patent Cooperation Treaty Application No. PCT/US2016/061924, entitled "Systems and Methods for Providing Interactive Streaming Media," filed Nov. 14, 2016, the contents of each of which are incorporated herein by reference in their entirety.

BACKGROUND

Computing devices, including mobile devices such as "smart" telephones and tablets, execute applications that may include functionality for presenting content received via a network. In some instances, the application does not select the content to be received nor control the source of the received content; instead, the application is a conduit for presenting the content. The received content may be simple, such as presentation of text or a two-dimensional image, or the received content may be more complex, such as presentation of a multi-media content or an interactive content. Presentation of this more complex content can be limited by certain technical constraints.

SUMMARY

In some implementations, a host server provides to a client device, via a network, a media stream for presentation at the client device within an execution environment of a first application executing at the client device. The remote host server executes a second application in an simulation environment (e.g., virtual or emulation environment) for the client device, and provides output from the second application to the client device as the media stream for presentation. In some implementations, the media stream is provided to the client device responsive to a request from the client device. In some implementations, the media stream is presented at the client device in an interactive interface. In such implementations, the client device detects interaction events during presentation of the media stream, and transmits descriptions of the detected interaction events to the remote host server. For example, without limitation, an interaction event may include: button utilization; touch-screen contact (a "tap"); device movement or motion, or a change in direction, velocity, or intensity of a device movement or motion, or a change in device orientation (e.g., rotation yaw, pitch, or roll); increase or decrease in light detected by an image or light sensor; sound detection; and so forth. The host server receives the descriptions of the detected interaction events from the client device and recreates corresponding interaction events for the second application in the simulation environment.

Communication between the client device and the host server can be described as two mono-directional channels. A first channel in which the media stream is provided from the host server to the client device and a second channel in which the interaction event descriptions are provided from the client device to the host server. In some implementations, additional communication channels are established between the client device and the host server. The additional communication channels are side-band channels that enable the simulation environment at the host server to more closely resemble to the client device. In such implementations, the second application (executing in the simulation environment), can send messages through a side-band channel to the client device. Furthermore, in some such implementations, the second application can then receive responses from the client device via the side-band channel. For example, the second application may be enabled to request status or constraint information for a configuration or settings manager on the client device (e.g., to determine whether there are parental constraints with which the second application should adhere) and receive a response from the configuration or settings manager on the client device. As another example, the second application may be enabled to request access to a sensor on the client device (e.g., a microphone or image sensor on the client device) and receive authorized access to the sensor in response.

In some implementations, the host server prepares to provide the output from the second application to the client device prior to receiving a request, from the client device, to present the second application. The host server prepares to provide the output from the second application by establishing the emulation environment for the client device, executing the second application, and suspending execution of the second application at a cue point. In some implementations, the host server suspends execution of the second application by suspending the simulation environment itself. Then, responsive to receiving the request to present the second application, the host server resumes execution of the second application (e.g., by resuming the simulation environment) and proceeds to provide, to the client device, output from the pre-cued second application as the media stream for presentation. In some implementations, the cue point is determined responsive to detecting a characteristic of the second application, e.g., that the second application is awaiting user input. In some implementations, the cue point is determined prior to suspending execution of the second application, e.g., after a predetermined extent of execution time. The predetermined extent of execution time may be determined, for example, by measuring a typical (e.g., mean average) delay, for a plurality of past presentations, between a past presentation of the second application and a corresponding initial user interaction with the respective past presentation of the second application.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements.

DETAILED DESCRIPTION

Figure 1:
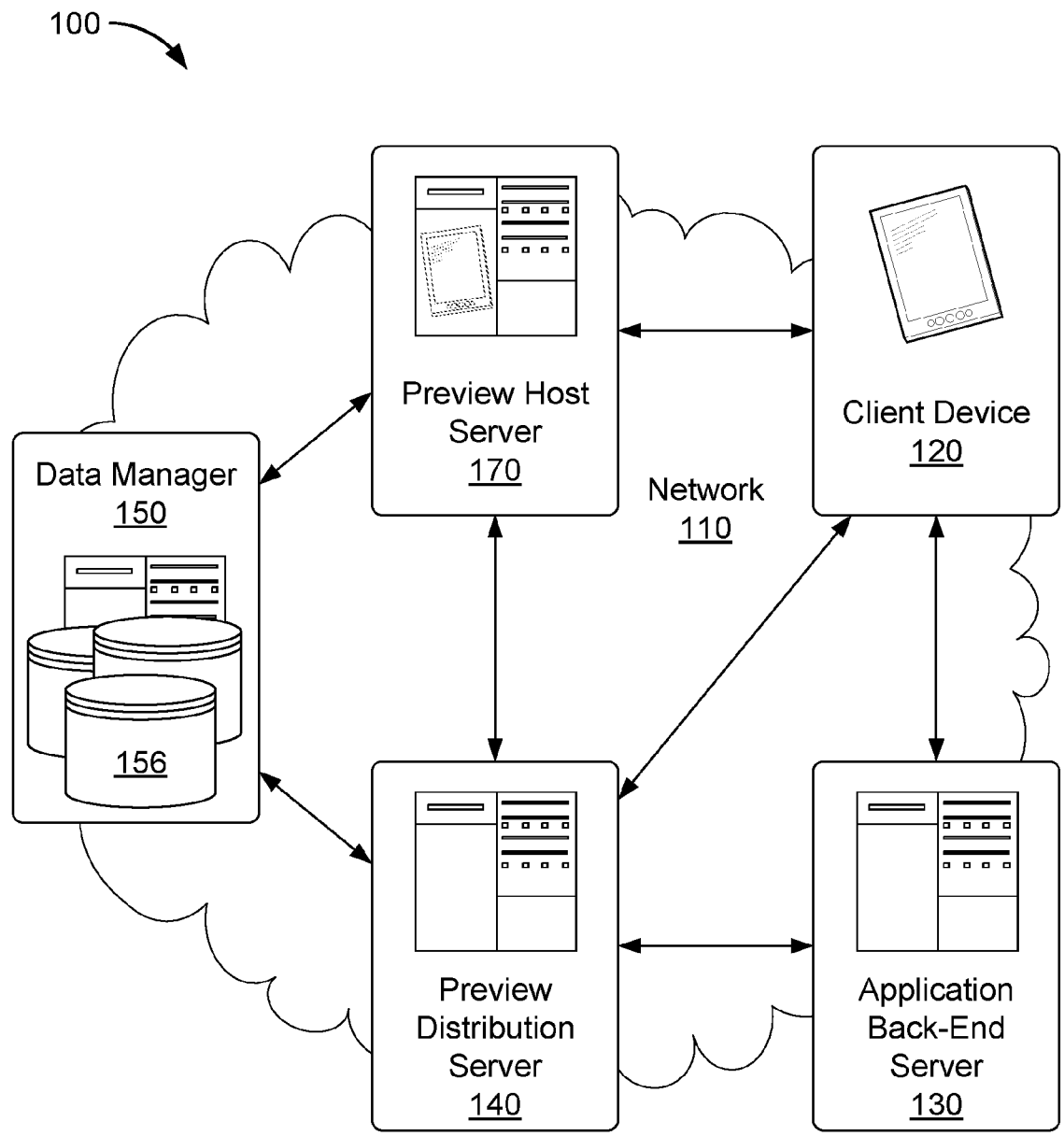
FIG. 1 is a diagram of an example preview system in a network environment.

FIG. 1 is a diagram of an example preview system in a network environment 100. A user of a client device can preview an application without installing the application on the client device. Instead of installing the application on the client device, the application is executed on a host server remote from the client device. This host server then provides a preview session to the client device by transmitting a media stream of the application to the client device via a network. An example environment for hosting such a preview session is shown in FIG. 1.

In broad overview of FIG. 1, the illustrated network environment 100 includes a network 110, an example client device 120, and several servers including an application back-end server 130, a preview distribution server 140, a preview host server 170, and a data manager 150 providing access to data storage devices 156. An application executing on the client device 120 may be a networked application that exchanges data with an application-specific back-end server 130. The application on the client device 120, or the application back-end server 130, may occasionally request to present on the client device 120, e.g., requesting a preview from the preview distribution server 140. In some instances, the content may be content sourced from a third-party such as an advertiser or a developer of an application to be previewed. The distribution server 140 selects content for presentation, e.g., a demonstration of an interactive application or game, and the client device 120 connects to a content host. For interactive applications or games, the content host is a preview host server 170 that executes a hosted application in a simulation execution environment representative of the client device 120, e.g., where the hosted application is an instance of the application or game to be demonstrated. An audio-visual media stream is sent from the preview host server 170 to the client device 120 for presentation. If a user of the client device 120 interacts with the presented media stream, interaction data is sent back to the preview host server 170 where the interaction is then recreated in the simulation execution environment. For example, in some implementations, the simulation execution environment is a virtual machine configured such that audio-video output from the virtual machine is transmitted in the media stream and interaction data is used to recreate the interaction input at the virtual machine. The preview host server 170 and the preview distribution server 140 may make use of data managed by the data manager 150 and stored in the data storage devices 156.

Still referring to FIG. 1, and in more detail, a network 110 enables communication between a client device 120 and the servers, e.g., the application back-end server 130, the preview distribution server 140, and the preview host server 170. In some implementations, data flows through the network 110 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 110 layered over an OSI layer-3 network protocol such as Internet Protocol (IP), e.g., IPv4 or IPv6. The network 110 is composed of various network devices linked together to form one or more communication paths between participating devices. Each networked device includes at least one network interface for receiving and/or transmitting data, typically as one or more data packets. An illustrative network 110 is the Internet; however, other networks may be used. The network 110 may be composed of multiple connected sub-networks. The network 110 can be a local-area network (LAN) such as a company intranet, a metropolitan area network (MAN), a wide area network (WAN), an inter network such as the Internet, or a peer-to-peer network, e.g., an ad hoc WiFi peer-to-peer network. The data links between devices in the network 110 may be any combination of wired links (e.g., fiber optic, mesh, coaxial, twisted-pair such as Cat-5 or Cat-6, etc.) and/or wireless links (e.g., radio, satellite, microwave, etc.). The network 110 may include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Term Evolution (LTE), or any other such protocol including, but not limited to, so-called generation "3G," "4G," and "5G" protocols. The network may include short-range wireless links, e.g., via Wi-Fi, BLUETOOTH, or ZIGBEE, sometimes referred to as a personal area network (PAN) or mesh network. The network 110 may be public, private, or a combination of public and private networks. The network 110 may be any type and/or form of data network and/or communication network.

Figure 4:
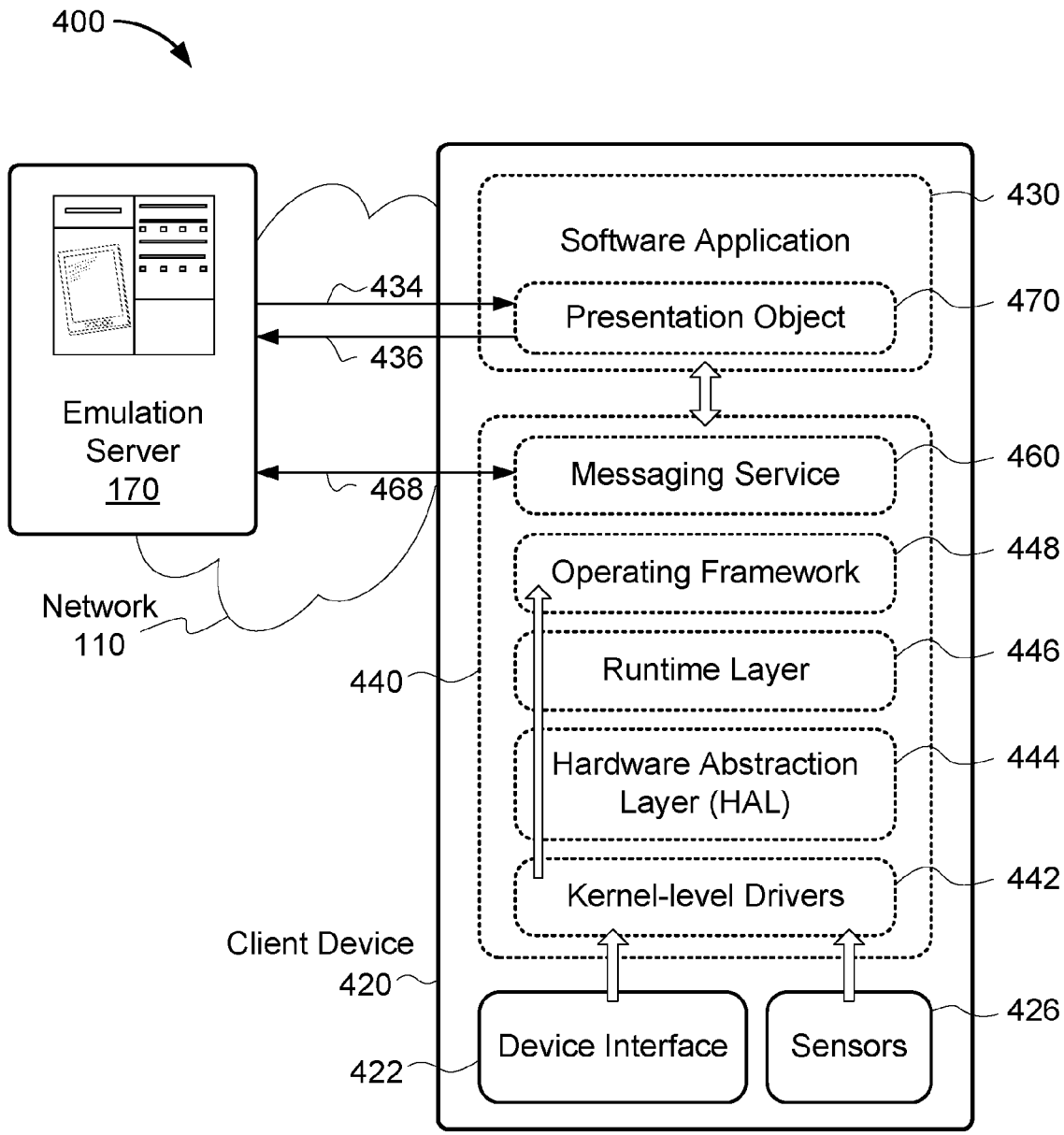
FIG. 4 is a diagram illustrating an example flow of data on a client device during an example interactive preview session.
Figure 10:
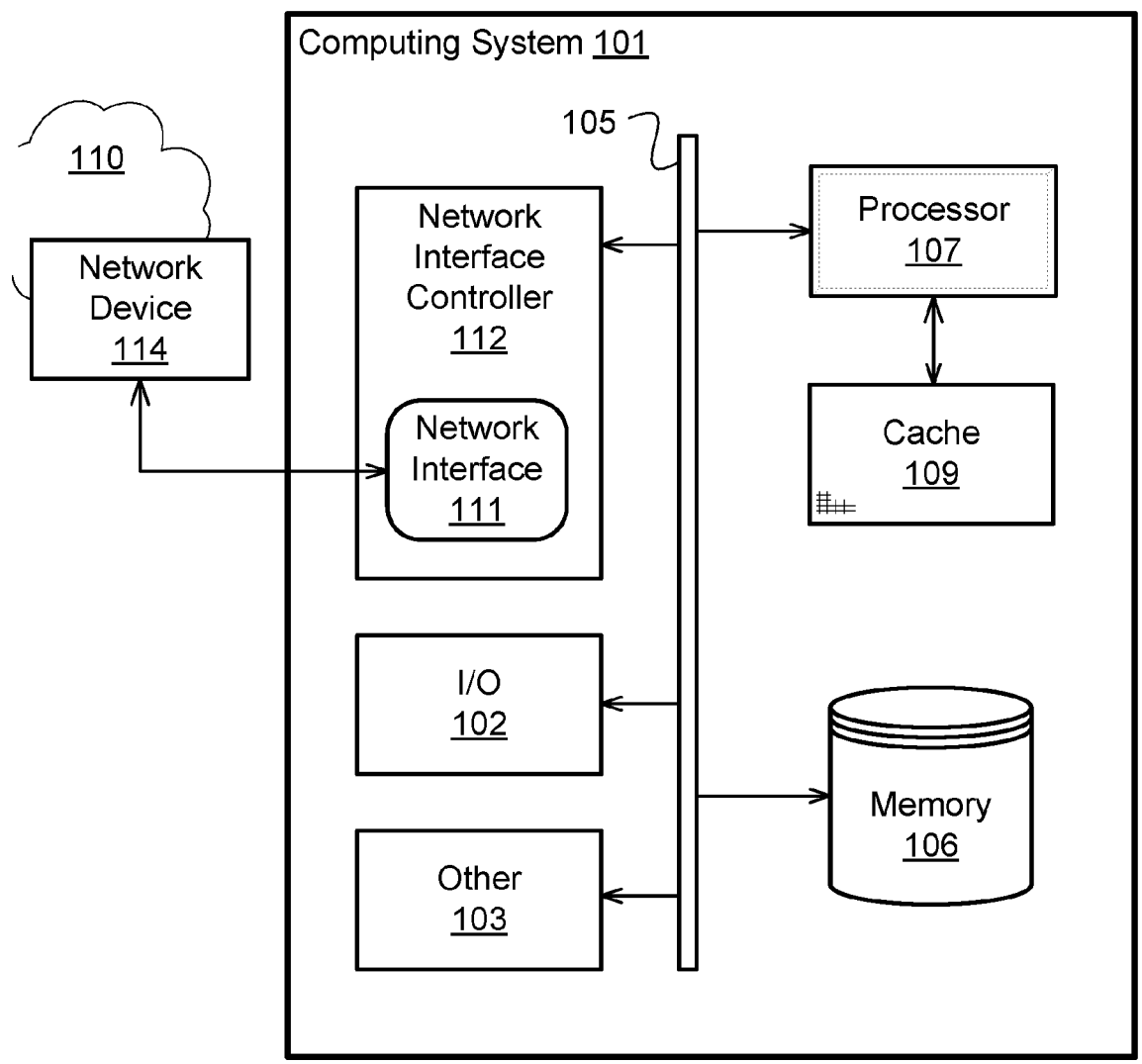
FIG. 10 is a block diagram of a computing system suitable for use in the various implementations described.

The example client device 120 is a computing system, or processor-based device, that executes applications, presents output to a user, and receives input from the user. The client device 120 is capable of exchanging information with the servers 130, 140, and 170 via the network 110. The client device 120 may be any kind of computing device, including, for example, a desktop computer, a laptop or notepad computer, a mobile device such as a tablet or electronic pad, a personal digital assistant, or a smart phone, a video gaming device, a television or television auxiliary box (also known as a "set-top box"), a kiosk, a hosted virtual desktop, or any other such device capable of exchanging information via the network 110. In some implementations, the client device 120 includes one or more hardware elements for facilitating data input and data presentation, e.g., a keyboard, a display, a touch screen, a microphone, a speaker, and/or a haptic feedback device. In some implementations, the client device 120 includes buttons, e.g., function-specific buttons (e.g., audio device volume controls such as volume up, volume down, mute, etc.) and/or function-agnostic buttons (e.g., a "soft" button that can be assigned specific functionality at a software level). In some implementations, the client device 120 includes a sensor capable of detecting movement of the client device 120 itself, e.g., an accelerometer, gyroscope, or tilt-sensor. An accelerometer may be a single-axis or multi-axis accelerometer. In some implementations, the client device 120 is implemented using special purpose logic circuitry, e.g., an application specific integrated circuit (ASIC). In some implementations, the client device 120 is implemented using a system on a chip (SoC) semiconductor device that includes at least one processor (or microprocessor) core. In some implementations, the client device 120 is implemented using a general purpose computing processor. FIG. 4, described in more detail below, is a diagram illustrating an example flow of data on a client device during an example interactive preview session. The client device 420 shown in FIG. 4 is an example of a client device suitable for use as the client device 120 shown in FIG. 1. FIG. 10, described in more detail below, illustrates a computing device that, in some configurations, is suitable for use as a client device 120.

In some implementations, the client device 120 runs an operating system managing execution of software applications on the client device 120, including one or more software applications capable of presenting a media stream from the preview host server 170. In some implementations, the operating system is provided with the client device 120. In some implementations, the client device 120 executes a browser application (e.g., a web browser) capable of receiving data formatted according to the suite of hypertext application protocols such as the Hypertext Transfer Protocol (HTTP) and HTTP encrypted by Transport Layer Security (HTTPS). In some such implementations, the browser facilitates interaction with the data visualization platform 130 in the form of one or more web pages. In some implementations, the browser application is provided with the client device 120. In some implementations, the client device 120 executes a custom application, e.g., a game or other application that interacts with the application back-end server 130. Interactions between the custom application and the application back-end server 130 may use standard protocols such as HTTP and HTTPS, or may use application-specific protocols, e.g., a custom application-layer protocol implemented over a transport-layer protocol such as UDP, TCP, or SCTP. In some implementations, the client device 120 includes a tool for obtaining and/or installing the custom application on the client device 120. In some implementations, one or more of the servers with which the client device 120 communicates supports a custom instruction set, e.g., an application programming interface (API), and the custom application executed on the client device 120 implements the API. An application can implement an API using, for example, a library or software development kit (SDK) provided to the application's developer.

The client device 120 communicates (or exchanges data) with various servers such as the application back-end server 130, the preview distribution server 140, and the preview host server 170. In some implementations, one or more of these servers are implemented using special purpose logic circuitry, e.g., an application specific integrated circuit (ASIC). In some implementations, the client device 120 is implemented using a system on a chip (SoC) semiconductor device that includes at least one processor (or microprocessor) core. In some implementations, one or more of these servers are implemented using a general purpose computing processor. FIG. 10, described in more detail below, illustrates a computing device that, in some configurations, is suitable for use as the application back-end server 130, the preview distribution server 140, and/or the preview host server 170.

In FIG. 1, the application back-end server 130 provides back-end support to an application executing on the client device 120. In some implementations, the application back-end server 130 runs a service that receives data from the client device 120 and sends data to the client device 120. For example, the application executing on the client device 120 may be a game, e.g., a multi-player game where game data for the different players is stored by the application back-end server 130; the application executing on the client device 120 may be a utility where some functions for the application are provided by the application back-end server 130; or any other sort of user-interactive application that utilizes a back-end server 130 for support. In some implementations, storing data remotely from the client device 120 allows for asynchronous interaction between multiple users or user devices, and provides an avenue for recovery in the event of a client device 120 failure.

In some implementations, the preview distribution server 140 receives a request to provide specific content and, responsive to the request, directs the client device 120 to obtain the content from the preview host server 170. In some implementations, the preview distribution server 140 is an advertising network server. In some implementations, the preview distribution server 140 runs a service identifying content, e.g., third-party content, for presentation on the client device 120. In some implementations, an application executing on the client device 120 generates a request to the preview distribution server 140, and the preview distribution server 140 then responds with a content selection. The content itself may be served from the preview distribution server 140 or from the preview host server 170, or from another server (not illustrated) such as a content storage server or servers distributed in a content delivery network (CDN). For example, if the selected content is an interactive preview, the interactive preview is served by the preview host server 170.

In some implementations, the preview distribution server 140 is an advertising network server. Advertisement networks provide advertising placement services. An application developer can use the advertisement network to place advertisements within an application and receive compensation from advertisers for ads placed through the advertising network. In some advertising networks, advertisers pay for presentation events (referred to as "impressions"). In some advertising networks, advertisers pay when a recipient of an advertisement selects (e.g., clicks on or taps on) an advertisement and is taken to a transaction interface such as a landing page or application store. These selection events (e.g., clicks or taps) are referred to as a "click through" events. In some advertising networks, advertisers pay different amounts for impressions versus click-through events; in some cases, not paying for impressions at all. In some advertising networks, an advertiser pays for an impression only if a recipient of the advertisement engaged with the advertisement. In some implementations, to encourage engagement, an end user is offered an opportunity to obtain a reward in exchange for viewing or engaging with an advertisement. This is referred to as a "rewarded ad." For example, a rewarded ad might be presented in a game application such that a game player could earn "in-game" rewards by watching or engaging with the rewarded ad. The player's in-game reward could be, for example, in-game currency, extra player "lives," recovery from an in-game terminal event, additional playing time, and so forth. In some implementations, the rewarded ad is a playable application streamed from an advertising network server (e.g., the preview host server 170). In some implementations, the playable application is a functional demonstration version of a full-feature application available for installation. In some implementations, the rewarded ad plays for a predetermined number of seconds (a preview presentation session allotment time), during which the end user is expected to engage with the presented advertisement, e.g., to play a sample game for a few seconds. In some implementations, the rewarded ad is presented within the context of a first application, and the first application effectively transfers interface control to the demonstration application being presented.

The data manager 150 provides data storage and management services persisting data in memory 156. The memory 156 may be implemented using one or more data storage devices. The data storage devices may be any memory device suitable for storing computer readable data. The data storage devices may include a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or BLU-RAY discs). Example implementations of suitable data storage devices include storage area networks (SAN), network attached storage (NAS), and redundant storage arrays.

The data manager 150 controls access to the memory 156. In some implementations, the data manager 150 hosts a query engine. In some implementations, the data manager 150 hosts a relational database, e.g., using a Relational Database Management System (RDBMS). In some implementations, the data manager 150 manages data in the memory 156 as files, e.g., XML files. In some implementations, the data manager 150 regulates access to data or features using credentials or account management utilities. In some such implementations, credential or account information is stored by the data manager 150 in the memory 156.

A database, or more specifically a database management system (DBMS), organizes data in accordance with a database definition, e.g., a database schema. In a basic relational database, the DBMS maintains data in a table-like data structure. Each table has columns, each corresponding to an entry type, classification, or purpose. For example, a table might have a column for numerical data, a column for text data (e.g., a description of the numerical data), a column for date data, and so forth. In a relational database, each entry in a column in a table is also in a row associating the entry with entries from other columns in the table. In some instances, an entry will associate a row from one table with one or more rows in another table. In some DBMS implementations, virtual tables called "views" represent data pulled from one or more tables as though it, too, were a table (that is, the view looks to a database client or user as though it was a table, but is not necessarily stored as such). Other types of database management systems can also be used, including various types of relational databases, object oriented databases, document oriented databases, XML databases, NoSQL databases, and so forth. Many of these database types use tables, or table-like structures, in a manner similar to that described above in reference to relational databases. A client or user of a database can add data to, modify data in, or retrieve data from the database using database instructions, e.g., queries in a database query language such as the Structured Query Language (SQL).

One or more database instructions may be grouped together into a database transaction. Traditionally, a database provides transaction atomicity, consistency, isolation, and durability. These properties are known by the acronym "ACID." In some implementations, the data manager 150 provides a knowledge base with all of the ACID properties. However, in some implementations, the data manager 150 does not provide all of the ACID properties.

In some implementations, one or more of the servers 130, 140, and 170, are in communication with the data manager 150, e.g., via a direct link or the network 110. In some implementations, one or more of the servers 130, 140, and 170, obtain data from the data manager 150 using queries in a formal query language such as Structured Query Language (SQL), Hyper Text Structured Query Language (HTSQL), Contextual Query Language (CQL), Data Mining Extensions (DMX), or XML Query (XQuery). In some implementations, one or more of the servers 130, 140, and 170, obtain data from the data manager 150 using an inter-process communication architecture such as the Common Object Request Broker Architecture (CORBA), Remote Procedure Calls (RPC), Object Linking and Embedding (OLE), Component Object Model (COM), or Distributed Component Object Model (DCOM). In some implementations, one or more of the servers 130, 140, and 170, obtain data from the data manager 150 using natural language or semantic queries. In some implementations, one or more of the servers 130, 140, and 170, obtain data from the data manager 150 using queries in a custom query language such as a Visualization API Query Language.

The preview host server 170 provides third-party content to the client device 120. In some implementations, the preview host server 170 runs a media streaming service that streams media to a client device 120 via the network 110. In some implementations, the media stream is transmitted using a standard protocol such as UDP, TCP, or SCTP. In some implementations, the media stream is transmitted using a custom protocol. In some implementations, the media stream is unidirectional such that a client device 120 can receive the media stream but has no means of responding to the content of the media stream. In some implementations, the media stream is interactive such that a client device 120 has a means of responding to the content of the media stream, e.g., such that a source of the content of the media stream can be responsive to the interaction. For example, in some implementations, the preview host server 170 receives instructions from the client device 120 for modifying the media stream content and the preview host server 170 modifies or updates the stream content in accordance with the received instructions.

In some implementations, the preview host server 170 runs a simulated version of the client device 120. For example, in some implementations, the preview host server 170 is a hypervisor running a virtual machine from an image of the client device 120. The virtual machine is a virtualized version of the client device 120, i.e., a simulation of the client device 120. In some implementations, the preview host server 170 executes an emulator for the client device 120, providing an emulated client device 120 as a simulation of the client device. In some implementations, the preview host server 170 is a client simulation server.

In some implementations, the preview host server 170 running a simulated version of the client device 120 generates a media stream from the simulation, e.g., streaming an audio-video media composite from an audio output buffer and from a graphics display buffer for the simulated device. The media stream is transmitted by the preview host server 170 to the client device 120, where it can be presented by the client device 120. A user of the client device 120 may interact with the client device 120, e.g., clicking or tapping on elements presented in the media stream. These interactions are captured at the client device 120 and transmitted to the preview host server 170, where they are recreated by the preview host server 170 for the simulated version of the client device 120. In this manner, the user of the client device 120 has an experience of interacting with the simulated version of the client device 120 as though the interaction was with the actual client device 120. An application can be installed on the simulated version of the client device 120, and the user can interact with the application, without the application being installed on the actual client device 120.

In some implementations, the simulated version of the client device 120 is simulated from a client image, e.g., a virtual machine image or a data set documenting configuration and memory state for a client to be simulated. In some implementations, the simulated version of the client device 120 is simulated from a stock image of a generic client device 120. In some implementations, the simulated version of the client device 120 is simulated from a stock image of a generalized client device 120 having some properties in common with a specific client device 120. For example, the client device 120 and simulated version may run identical operating system versions, may have matching display sizes or display quality levels, and/or may have equivalent computer processor and/or memory parameters. By having properties in common, the user experience interacting with an application installed on the simulated device will closely match the user experience interacting with the application installed on the client device 120. However, when the application is installed and executing on the simulated device, it does not need to have been installed on the client device 120. In some implementations, a preview session begins by selecting, for simulation, a client image that best matches to (or has properties similar to) a client device 120 where the preview session will be presented.

In some implementations, as described in more detail below, the preview host server 170 has a suspended instance of a simulated (e.g., virtualized) version of the client device 120, and upon request, resumes the simulated instance of the client device 120. The suspended instance of the simulated client device includes an installed instance of a preview application. For example, the suspended instance may be created by executing the preview application in a simulation client device and suspending the simulation at a cue point. In some implementations, the cue point is identified using an implementation of the method 800 described below in reference to FIG. 8. When the preview host server 170 is requested to provide a media stream from the preview application, the preview host server 170 resumes the suspended instance of the client device and resumes execution of the preview application from the cue point. In some implementations, the preview host server 170 maintains multiple suspended instances of virtualized client devices each corresponding to different permutations of client device characteristics or properties. In such implementations, the preview host server 170 selects the suspended instance of the virtualized client device with characteristics or properties most closely aligned with the characteristics or properties of the client device 120 that will receive the stream. The preview host server 170 then resumes the selected suspended instance to provide the media stream in a preview session.

In some implementations, the client device 120 executes a preview presentation interface that receives the media stream from the preview host server 170 and presents it at the client device 120, e.g., in a preview session. Presenting the media stream may include presenting a visual portion of the media stream, presenting an audio portion of the media stream, or presenting both a visual and an audio portion of the media stream. In some implementations, the media stream includes force feedback data and the client device 120 presents the force feedback data while presenting the media stream, e.g., by vibrating the client device 120 or using other haptic feedback devices built into the client device 120.

In some implementations, the preview presentation interface executed by the client device 120 captures user interaction event data. Interaction event data may include, for example, mouse clicks, touch screen taps, button depressions, sensor actuation, and movement of the client device 120 (measured, e.g., by an accelerometer, gyroscope, tilt sensor, or other motion sensor built into the client device 120). The preview presentation interface captures this interaction data and transmits data representative of the captured interaction to the preview host server 170. In some implementations, the preview presentation interface captures interaction data by hooking sensor input interface libraries. In some implementations, the preview presentation interface provides side-band communication channels for exchanging messages between the preview host server 170 and the client device 120.

The client device 120 may execute a first application that includes presentation of content received from the preview host server 170. The first application may then load the preview presentation interface and present it to a user within an application program context for the first application. In some such implementations, the first application does not have access to the interaction inputs directed to the preview presentation interface.

Figure 2A:
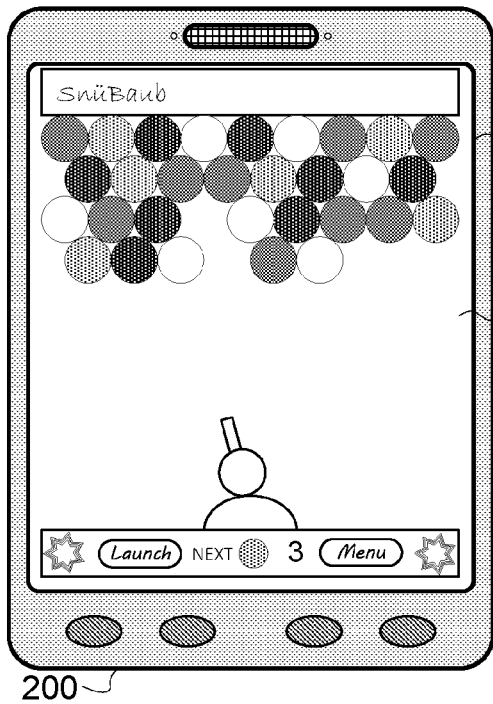
FIG. 2A, FIG. 2B, FIG. 2C, and FIG. 2D are illustrations of an example device displaying different stages of an application presenting a demonstration application in a preview presentation session.
Figure 2B:
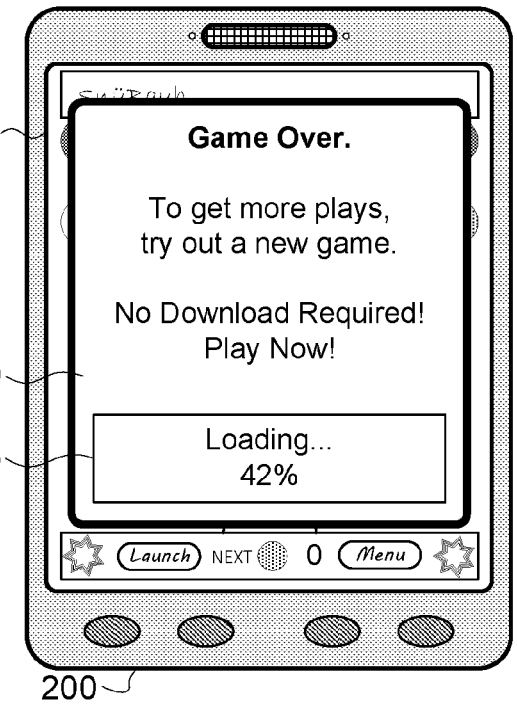
Figure 2C:
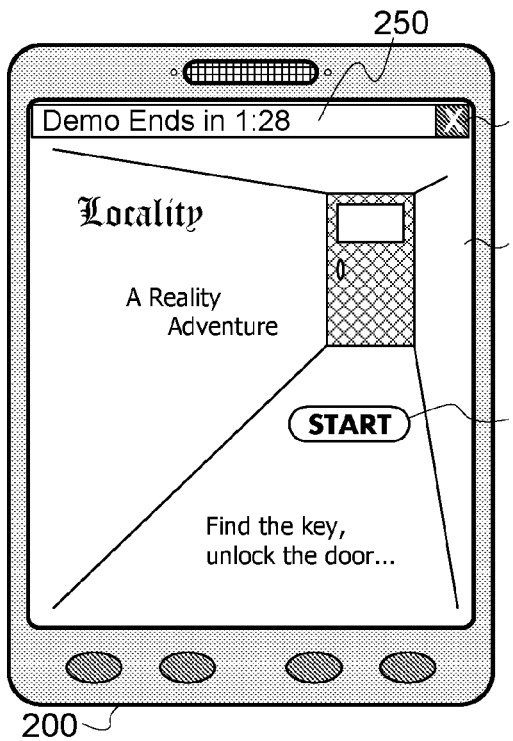
Figure 2D:
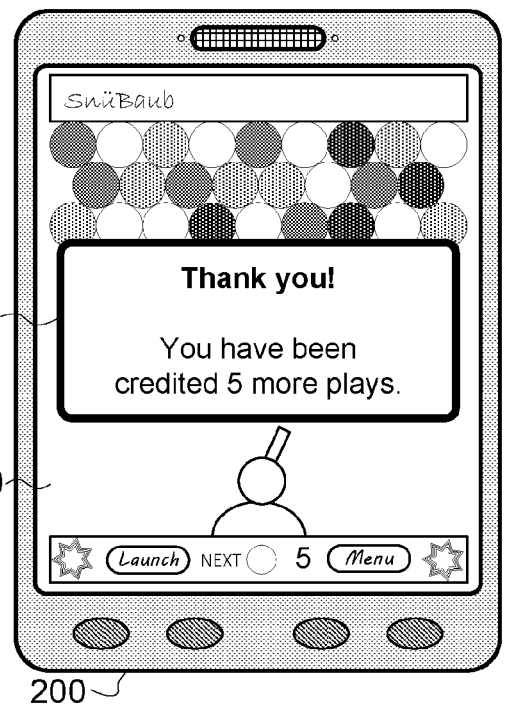

FIG. 2A, FIG. 2B, FIG. 2C, and FIG. 2D are illustrations of an example touch-screen device 200 displaying different stages of a game rewarding a player for engaging with a demonstration application in a preview presentation session. Although shown as games, in many implementations, either or both applications may be any type or form of application, including spreadsheet applications, database applications, word processing applications, banking utility applications, social network applications, educational applications, or any other such applications. In broad overview, and referring to the example shown in FIG. 2A, the touch-screen device 200 displays, on a screen 205, an example application graphical user interface (GUI) 210. The application GUI 210 is for a game in which a player (a user of the touch-screen device 200) earns play opportunities by engaging with a demonstration of another application, i.e., a demo game. When a player has exhausted a bank of play opportunities (e.g., lives, rounds, etc.), the player is presented with a preview presentation session for a demo game. After the preview presentation session has ended, based on the player engaging with the other application, the player is rewarded with additional play opportunities (plays). FIG. 2B is an illustration of a transition screen 230 that may be presented at the beginning of a preview presentation session, e.g., when the player has exhausted the bank of play opportunities. FIG. 2C is an illustration of the example touch-screen device 200 displaying a GUI 240 for the demo game during the preview presentation session. FIG. 2D is an illustration of a reward message 260 presented after the preview presentation session, e.g., responsive to the player having engaged with the demo game.

Referring to FIG. 2A in more detail, the touch-screen device 200 is an example of a client device 120 in which a user interacts with the touch-screen device 200 by tapping, swiping, or otherwise touching a screen 205 on the touch-screen device 200. In FIG. 2A, the screen 205 is displaying an example application GUI 210 for a first game. The illustrated example game allows a user to have a limited number of plays before the user needs to earn more play opportunities. In this example, the first game hosts a preview presentation session in which a user can demo another application (a demo game) in order to earn more play opportunities in the first game.

FIG. 2B is an illustration of a transition screen 230 that may be presented at the beginning of a preview presentation session, e.g., when the player has exhausted the bank of play opportunities. As depicted in FIG. 2B, the touch-screen device 200 presents a transition screen 230 with a message box explaining that the user should interact with the other application, a demo game, in order to obtain additional plays within the first application. The transition screen 230 makes it clear that the demo game can be played during the preview presentation session without installing the demo game on the touch-screen device 200. The playable demo game is provided in the preview presentation session from a remote server to the local device in a manner that does not require installation on the local device. For example, referring to FIG. 1, a preview host server 170 can support interaction with an application on a client device 120 without installing the application on the client device 120.

In the example depicted in FIG. 2B, the transition screen 230 includes a visual element 235 indicating that the demo game is loading. In some implementations, the visual element 235 is an animated graphic, e.g., an hourglass or pinwheel. In some implementations, the visual element 235 is updated responsive to an indicator received from the demo game. In some implementations, the demo game is pre-cued and provided from a pre-cued state, e.g., using the method 700 described below in reference to FIG. 7. Providing the demo game (or any preview application) from a pre-cued state can reduce the amount of loading time shown in transition screen 230. In some implementations, pre-cueing can eliminate load time and the transition screen 230 may be skipped or omitted.

FIG. 2C is an illustration of the example touch-screen device 200 displaying a GUI 240 for the demo game during the preview presentation session. The GUI 240 shown in FIG. 2C is an example splash screen for the playable demo game. A message bar 250 is shown above the splash screen indicating that the preview presentation session for the demo game is a time-limited preview. An escape button 255 is also shown. In some implementations, the preview presentation session has a predetermined time limit. However, in some such implementations, a user may be allowed to quit or exit the preview presentation session before the predetermined time has elapsed, e.g., by clicking or selecting the escape button 255. In some implementations, the escape button 255 is not shown (or is disabled) during an initial period of the preview presentation session, and is then shown (or enabled) after the initial period. In some implementations, the initial period is percentage of the predetermined time for the preview presentation session. In some implementations the initial period is a fixed length of time, e.g., 15 seconds. In some implementations, the initial period ends a fixed length of time after the demo game has finished loading.

In some implementations, the visual element 235 (shown in FIG. 2B) indicating that the demo game is loading is displayed over the splash screen from the demo game itself, instead of the transition screen 230. In some implementations, no transition screen 230 is used. Instead, the splash screen introducing the demo game is shown and a message is displayed indicating that the demo game is "playable."

When the demo game has loaded, it may present an interface for user engagement. For example, as shown in FIG. 2C, the demo game may present a "start" button 245. In some implementations, the demo game might present a control interface, instructions for play, or some other indicator that the game is ready for user interaction. A user may then engage with the demo game, e.g., tapping on the "start" button 245, tapping playable elements of the demo game, moving the touch-screen device 200 to actuate internal motion sensors, and so forth. As discussed above, the location of the playable elements of the game such as button 245 may be unknown or unavailable to a host application, operating system of the device, or client agent. Detecting interactions with such elements may be performed via the indirect systems and methods discussed herein. In some implementations, when the preview presentation session time has ended, or when the user selects the escape button 255, the host application receives an indicator of whether the user engaged with the demo game.

FIG. 2D is an illustration of a reward message 260 presented after the preview presentation session, e.g., responsive to the player having engaged with the demo game. In FIG. 2D, the first game GUI 210 is displayed with a message box 260 explaining the reward provided responsive to the user having engaged with the demo game during the preview presentation session.

Figure 3:
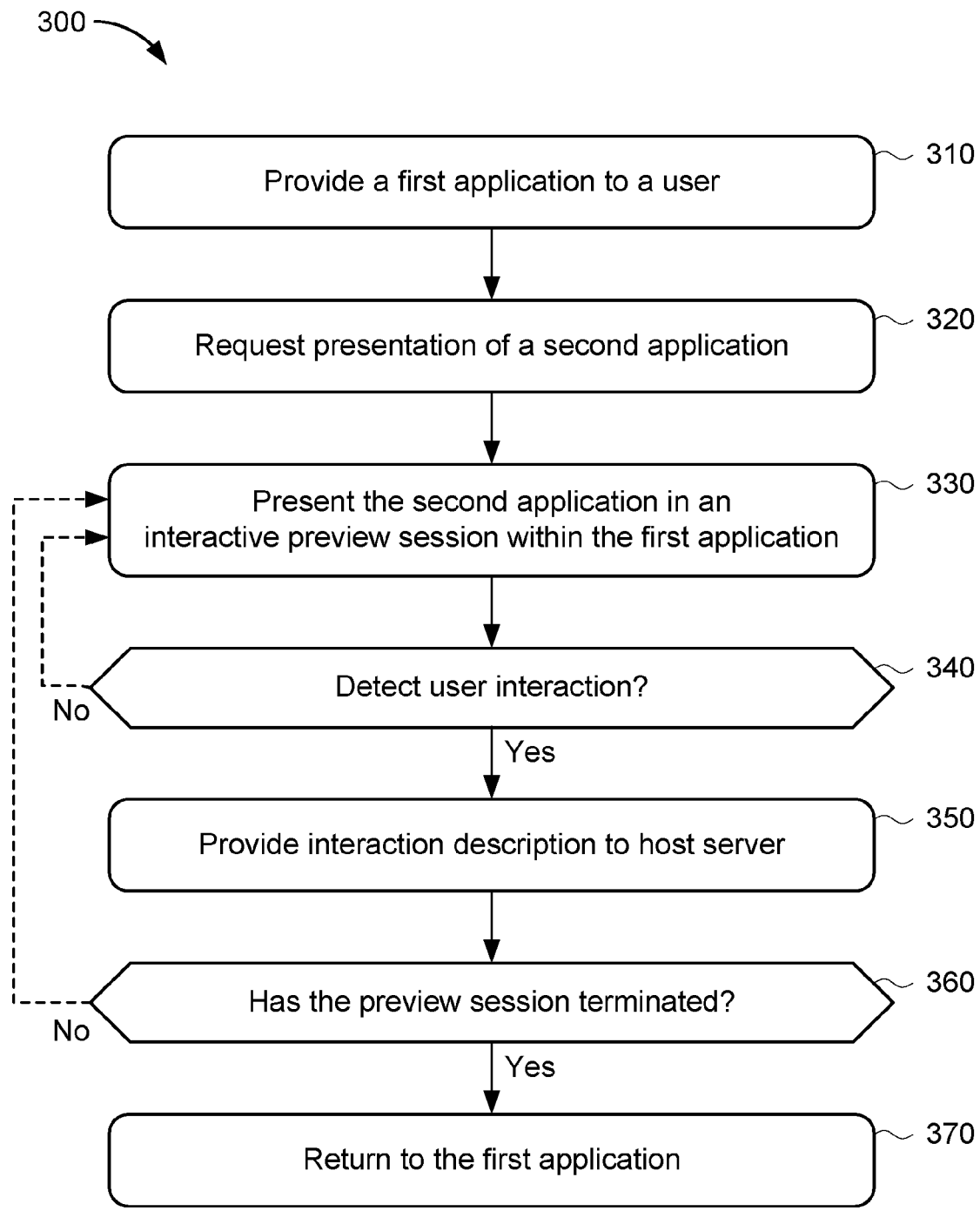
FIG. 3 is a flowchart for an example interactive preview session

FIG. 3 is a flowchart 300 for an example interactive preview session. The illustrations in FIG. 2A, FIG. 2B, FIG. 2C, and FIG. 2D are for one example of such a preview session, and are referenced as examples in the following description of FIG. 3. However, these illustrations are merely examples of an example application executing on a client device, presenting a reward opportunity, presenting interactive third-party content, and presenting a reward. These examples are not meant to be limiting.

Referring to FIG. 3 in broad overview, throughout the flowchart 300, a user may interact with applications presented on a client device (e.g., the client device 120 shown in FIG. 1). There is a first application, which may be executed locally on the client device, and a second application presented within the context of the first application, but which may be executed remotely, e.g., on a preview host server 170 (as shown in FIG. 1). In the flowchart 300, at stage 310, the client device provides a first application to a user. At stage 320, the client device requests presentation of a second application, e.g., sending the request to a preview distribution server 140 (as shown in FIG. 1). At stage 330, the client device presents the second application in an interactive preview session within the first application. At stage 340, the client device detects user interaction with the second application. At stage 350, the client device provides an interaction description to the host server, e.g., sending a description of the interaction detected at stage 340 to the preview host server 170 (as shown in FIG. 1). At stage 360, the client device determines whether the preview session has terminated. At stage 370, the client device, having determined that the preview session is over, returns to the first application. In some implementations, during the preview session, the first application does not receive any interaction input, as all such interaction data is effectively redirected to the host server in stage 350. In some implementations, upon returning to the first application in stage 370, the client device provides the first application with feedback or analytics regarding the preview session.

Referring to FIG. 3 in more detail, at stage 310, the client device provides a first application to a user. The first application is executed by the client device in an execution environment. The execution environment may include, for example, the operating system and any dynamic load libraries provided by the operating system. In some implementations, the execution environment includes device drivers, sensor managers, and the like. In some implementations, the execution environment includes an operating system kernel where the kernel includes device drivers. In some implementations, the execution environment includes a hardware abstraction layer. The first application may be a software utility, a social media application, a game, or any other application that could be executed on a client device. The user interacts with an interface on the client device to interact with the first application. For example, the user may interact with the first application by physically touching a touch-screen on the client device (e.g., as described above in reference to the example graphical user interface 210 on the touch-screen device 200 illustrated in FIG. 2A). In some implementations, the user may interact with the first application by tapping on a screen, depressing buttons on the client device, by moving or shaking the client device (actuating a device motion sensor), or by speaking to a microphone on the client device. In some implementations, the client device includes a camera and the user interacts with the first application via the camera.

At stage 320, the client device requests presentation of a second application, e.g., sending the request to a preview distribution server 140 (as shown in FIG. 1). In some implementations, the request for presentation of the second application includes data indicating characteristics of the requesting device, that is, of the client device 120. For example, the request may indicate a make and model of the client device 120, indicate an operating system build or version, indicate physical properties such as screen size, processor chip set, memory available, etc. In some implementations, the request for presentation of the second application specifies the second application. In some implementations, the request for presentation of the second application is a request for any arbitrary second application. For example, the request may be transmitted from the client device 120 to a preview distribution server 140 responsible for selecting content to be delivered to the client device 120. The preview distribution server 140 may then identify a specific application for the preview session. In some implementations, the preview distribution server 140 causes delivery of the preview session content for the second application to the client device 120, e.g., from a preview host server 170. In some implementations, the preview distribution server 140 provides preview session request data to the client device 120, and the client device 120 requests delivery of the preview session content for the second application from the preview host server 170. In some implementations, the request is embedded in a uniform request locator (URL). For example, in some implementations, the preview distribution server 140 provides a URL to the client device 120 and the client device 120 attempts to retrieve data from the provided URL, effectively requesting the preview session content. In some implementations, the request is formatted in accordance with a custom request protocol, e.g., a protocol that includes cryptographic signatures and/or encrypted request identifiers.

At stage 330, the client device presents the second application in an interactive preview session within the first application. The interactive preview presentation session is an opportunity for the user to engage with the third-party content, i.e., the second application. For example, the second application may be presented as a reward opportunity in the first application, giving a user an opportunity to earn something (an incentive) by watching or engaging with third-party content, e.g., previewing another application. The incentive may be a reward within the first application itself, or may be access to something external to the application. For example, if the application is a game, the incentive might be additional "plays" or "lives" within the game, access to additional in-game resources, levels, or features, a grant of additional in-game currency or credit, additional playing time, acceleration of time-delayed in-game elements, and so forth. If the application is a utility, e.g., a photography editing program or presentation utility, the incentive might be access to additional tools, filters, custom graphics, clip-art, "stickers," and so forth. Some applications may rely on back-end servers, e.g., the application back-end server 130 shown in FIG. 1, and the incentive may be tied to resource utilization on the back-end server. For example, the application may include functionality that is performed on the back-end server and the user may be rewarded with access to the back-end functionality based on engagement with the third-party content. As another example, the application may allow for storing data with the back-end server and the incentive may be additional data storage space. In some implementations, the incentive is external to the application. In some implementations, the incentive is a coupon or ticket redeemable at a restaurant, retail store, amusement park, theater, performance venue, equipment rental location, service provider, and so forth. In some implementations, the incentive is an entry into a drawing or raffle. The incentive can be anything the application uses to reward a user for engaging with the third-party content.

In some implementations, the application presents the third-party content to a user by instantiating an interactive preview presentation session through a function call to an application programming interface (API). In some implementations, the application presents the third-party content to a user by instantiating an interactive preview presentation session using utilities provided in a software developer kit (SDK). In some implementations, the application presents the third-party content to a user by instantiating an interactive preview presentation session through a function call to a dynamic load library (DLL). In some implementations, the second application is presented within a display window framed by the first application. For example, in FIG. 2B, the transition screen 230 is shown presented in a display window framed by the first application. In some implementations, this window is used to present the second application. When presented within such a window, the second application is clearly presented within the context of the first application. The smaller display space of the window may also reduce variation between presentation devices (that is, the framing portion of the display may vary between devices with different screen sizes or resolutions, while allowing the window itself to have a more consistent size and resolution). In some implementations, the second application is presented using the entire screen. For example, in FIG. 2C, the graphical user interface (GUI) 240 shown is an example splash screen for a playable demo game using the entire screen 205 on the illustrative touch-screen device 200, where a message bar 250 with an escape button 255 is layered over the GUI 240. When presented using the entire screen 205, the second application is presented in the same manner in which it would be viewed by a user should the user install the second application on the client device. That is, by using the entire screen 205, the user receives a preview experience similar to having the second application running natively.

At stage 340, the client device detects user interaction with the second application. From the perspective of the user, the second application presented at the client device is interactive. The user can engage with any interface the second application presents, e.g., by tapping on virtual buttons displayed on a touch-sensitive screen. In some implementations, the user can interact with the second application by pressing or actuating physical buttons on the client device. In some implementations, the user can interact with the second application by rotating, tilting, shaking, or otherwise physically moving the client device. Generally, any mode of interaction the user might use to interact with a locally installed application can be used to interact with the second application, even though the second application is not installed locally. These interactions occur at the local device, where each interaction event is received by one or more sensors on the local device and handled by the execution environment. For example, if a user rotates the client device, this activity is detected by a motion sensor (e.g., an accelerometer, gyroscope, or tilt-switch) and handled by device drivers or sensor managers in the execution environment. The client device translates the detected motion into a software event or signal, which is then reported to the first application, or to the second application. In some implementations, the second application is executing in a simulation environment on the preview host server 170, e.g., a virtual machine, and the client device transmits the interaction event description to the preview host server 170 where it is provided to the second application. The flow of data from the sensors to applications is discussed in more detail below, in reference to FIG. 4.

At stage 350, responsive to detecting an interaction in stage 340, the client device provides an interaction description to the host server. For example, in some implementations, the client device sends a description of the interaction detected at stage 340 to the preview host server 170 via the network 110 (as shown in FIG. 1). The description provides, to the host server, sufficient information to recreate the interaction at the host server, e.g., as input to the second application. In some implementations, the client device captures, hooks, or intercepts signals from input sensors on the client device (e.g., a touch-screen, accelerometer, tilt-sensor, button, microphone, or light sensor) and transmits the captured, hooked, or intercepted signal to the host server. In some implementations, the information transmitted to the host server is packaged in a data structure. For example, the client device may include additional contextual information in the data structure, e.g., a time value indicating when the interaction was detected. In some implementations, the interaction description (or data structure including the interaction description) is compressed at the client device, and the client device provides the interaction description to the host server by transmitting the compressed information to the host server.

At stage 360, the client device determines whether the preview session has terminated. A preview session may terminate, for example, when a pre-determined length of time has elapsed, when the second application terminates, or when the client device requests early termination, e.g., as a result of a user selecting an escape button. In some implementations, the client device receives a signal from the host server indicating that the preview session has terminated. In some implementations, the client device generates and sends a signal to the host server indicating that the preview session has terminated.

At stage 370, the client device, having determined that the preview session is over, returns to the first application. In some implementations, during the preview session, the first application does not receive any interaction input, as all such interaction data is effectively redirected to the host server in stage 350. In some implementations, upon returning to the first application in stage 370, the client device provides the first application with feedback or analytics regarding the preview session.

In some implementations, an analyzer applies an interaction heuristic to the interactions detected at stage 340. The interaction heuristic converts a data set representative of interaction events occurring during the preview presentation session into a likelihood that a user of the client device 120 engaged with the media stream. The heuristic may be used to determine whether a user engaged with or ignored the client device during the preview presentation session. For example, if the client device 120 is set down, with the front screen of the client device 120 facing down, or if the device audio playback is set to mute during the preview presentation session, these could be strong indicators that the user did not engage with the content. Likewise, small motions of the client device 120 may indicate that the user continued to hold the device during the preview presentation session, which may suggest a higher likelihood of engagement. In some implementations, a heuristic takes into account whether or not the screen changed display states during the preview presentation session. For example, if the screen displays a menu option awaiting user input, and does not change, this could indicate that the user did not engage with the content. In some implementations, a heuristic takes into account whether an escape button (e.g., the escape button 255) was used to terminate the preview presentation session early (however, early termination does not necessarily mean that the user didn't engage—the user might have finished engaging with the third-party content before an allotted period of time had elapsed). As another example, if the volume of the device audio playback is increased or un-muted, these events may indicate the user engaged with the third-party content during the preview presentation session. In some implementations, when, the client device returns to the first application at stage 370, the client device provides information to the first application based on evaluation of the interaction heuristic. For example, in some implementations, the client device provides the first application with a value corresponding to a probability or likelihood that the user engaged (or did not engage) with the content presented in the interactive preview session in state 330.

FIG. 4 is a diagram 400 illustrating an example flow of data on an example client device 420 (e.g., a client device 120) during an example interactive preview session. In the diagram 400, the example client device 420 executes a software application 430 that provides a preview session in a presentation object 470, e.g., as described above in reference to FIG. 3. The presentation object 470 receives, via a network 110, a media stream 434 from a remote host server (e.g., a preview host server 170, as shown in FIG. 1). The presentation object 470 facilitates interactive preview sessions by transmitting descriptions 436 of physical events to the remote host server (i.e., the preview host server 170). The example client device 420 detects physical events using device interfaces 422 and sensors 426. In some implementations, a device interface 422 may require some form of user action to receive input, and a sensor 426 may be more passive in detecting current device conditions without regard to (or requiring) user action. In some implementations, as depicted in FIG. 4, an application stack 440 conveys information from the device interfaces 422 and sensors 426. For example, in some implementations, the application stack 440 includes kernel-level drivers 442 and a hardware abstraction layer 444 (HAL 444). The kernel-level drivers 442 receive data representative of the physical event from the device interfaces 422 and/or sensors 426, and the kernel-level drivers 442 pass the data to the HAL 444. The illustrated application stack 440 also includes a runtime layer 446 that executes on the HAL 444 to support an operating framework 448. The runtime layer 446 uses the HAL 444 to present applications (e.g., the software application 430) with a uniform execution platform regardless of minor differences between different hardware platforms. The operating framework 448 provides process managers, utilities, libraries, and other resources used by applications, e.g., the software application 430. For example, in some implementations, the application stack 440 includes a messaging service 460 for exchanging messages 468 with the preview host server 170. In some implementations, the presentation object 470 uses resources from the application stack 440. In some implementations, the messaging service is incorporated into the software application 430. The illustrated example architecture and flow of data is not meant to be limiting; alternative device designs pass data from sensors and input mechanisms to software and/or to remote servers in other manners, e.g., using different architectures.

The example client device 420 is a computing system, or processor-based device, that receives input and executes software applications. The example client device 420 may be any device capable of functioning as described, and may be, for example, the client device 120 described above in reference to FIG. 1. In some implementations, the example client device 420 includes one or more hardware device interface 422 elements for facilitating data input and data presentation, e.g., a keyboard, a display, a touch screen, a microphone, a speaker, and so forth. In some implementations, device interfaces 422 include dedicated buttons, such as volume buttons. In some implementations, device interfaces 422 include "soft" button, such as physical buttons with software-assignable purposes and tasks as well as buttons displayed on a touch-screen. In some implementations, the example client device 420 includes one or more sensors 426 capable of passively detecting physical events, e.g., motion sensors (such as single-axis or multi-axis accelerometers, tilt sensors, and gyroscopes), finger print sensors, light sensors, image sensors (e.g., cameras), temperature sensors, humidity sensors, and so forth. In some instances, a sensor 426 may be used as a device interface 422, such as when a user rotates the 420 client device 420 to cause a software response. The device interfaces 422 and sensors 426 can each be any device capable of converting a physical event into electronic signals. In some implementations, the example client device 420 is implemented using special purpose logic circuitry, e.g., an application specific integrated circuit (ASIC). In some implementations, the client device 120 is implemented using a system on a chip (SoC) semiconductor device that includes at least one processor (or microprocessor) core. In some implementations, the example client device 420 is implemented using a general purpose processor. FIG. 10, described in more detail below, illustrates a computing device that, in some configurations, is suitable for use as an example client device 420.

The example client device 420 runs an operating system kernel that includes one or more kernel-level drivers 442. Each kernel-level driver 442 converts input signals received from a corresponding device interface 422 or sensor 426 into a data representation. In some implementations, the kernel-level drivers 442 are compiled into an operating system kernel. In some implementations, the kernel-level drivers 442 are dynamically loaded into the kernel, e.g., during a start-up or boot phase. In some implementations, the operating system kernel is a version of LINUX. In some implementations, the operating system kernel provides core system functionalities such as threading and some memory management. In some implementations, the operating system kernel uses an interrupt handler to process signals from a kernel-level driver 442.

The hardware abstraction layer (HAL) 444 is an abstraction layer that allows the same runtime layer 446 and operating framework 448 to function on multiple types of underlying physical hardware. The HAL 444 converts different data representations that may be generated by hardware-specific versions of the kernel-level drivers 442 into a uniform data representation. In some implementations, the HAL 444 includes an event handler. In some implementations, the HAL 444 includes an event monitor. In some implementations, the HAL 444 includes an event handler, where the event handler includes an event monitor.

The runtime layer 446 executes on the HAL 444 to support an operating framework 448 for applications executing on the example client device 420. In some implementations, the runtime layer 446 appears, to installed applications, as the operating system (instead of the lower-level operating system kernel previously described). In some such implementations, the runtime layer 446 provides one or more virtual machines for isolated application execution. In some implementations, the runtime layer 446 is a byte-code processing virtual machine such as a Java Virtual Machine (JVM).

The operating framework 448 provides process managers, utilities, libraries, and other resources used by applications, e.g., the software application 430. In some implementations, the operating framework 448 is responsible for managing software installations, user accounts, security, authentication, and so on. In some implementations, the operating framework 448 includes an event handler. In some implementations, the operating framework 448 includes an event monitor. In some implementations, the operating framework 448 includes an event handler, where the event handler includes an event monitor.

When a device interface 422 or sensor 426 experiences or detects a physical event, data representative of the event is passed to a corresponding kernel-level driver 442. This data then flows through the kernel-level drivers 442, the HAL 444, the runtime layer 446, and the operating framework 448, to the software application 430. In some implementations, the kernel-level driver 442 represents the event data using one format or data representation and the HAL 44 convert them to a more generalized input-type or sensor-type value. For example, the input may be voltage levels and the kernel-level drivers 442 may report the voltage levels as sensor-specific values. The HAL 444 may receive the sensor-specific values and convert them to a more generalized sensor-type value. The operating framework 448 facilitates exchange of these values to the software application 470. In some implementations, during a preview session, the software application 430 diverts all such input to a presentation object 470. The presentation object 470 can then transmit descriptions 436 of the detected physical events to the remote host server (i.e., the preview host server 170).

In some implementations, the application stack 440 includes a messaging service 460 for exchanging messages 468 with the preview host server 170. In some such implementations, a guest application executing in a simulation environment on the preview host server 170 can transmit messages 468 to the example client device that are received and processed by the messaging service 460. For example, in some implementations, the preview host server 170 provides the guest application with an interface (e.g., an API) for accessing the example client device 420. Messages to the interface are then transmitted to the example client device 420 where the messaging service 460 can handle them, and send reply messages 468 as necessary. In some implementations, the messaging service 460 present on the example client device 420 interacts with the operating framework 448 and runtime layer 446 directly, responsive to the server-generated messages 468, thereby facilitating direct communication with the example client device 420 from the guest application without going back through the software application 430 presenting the media stream 434.

In some implementations, a controller application (such as the messaging service 460, an application providing an interface to the messaging service 460, or an application incorporating the messaging service 460) executes on both the example client device 420 and in a simulation environment (e.g., a virtual machine or emulator) in which the guest application is executed at the preview host server 170. A query to the controller application in the simulation environment, e.g., from the guest application, is forwarded to the example client device 420 instance of the controller application, where it can then be processed in the client environment, and vice versa. In some implementations, an application determines that the messaging service is available, and derives from this that the application is being executed in a demonstration mode.

An example header for an implementation of the messaging service 460 is:

```
service StreamingService
{
    void setOnMessageListener( IMessageListener );
    void sendMessage( Message ) ;
}
```

In some implementations, the message transmitted to the client device is an access request for client device access. In some implementations, the message transmitted to the client device is an access request for access to system configuration data on the client device. In some implementations, the message transmitted to the client device is an access request for access to an audio sensor on the client device. In some implementations, the message transmitted to the client device is an access request for access to an image sensor on the client device. In some implementations, the message transmitted to the client device is an access request for access to a biometric sensor on the client device. In some implementations, the message transmitted to the client device is an access request for access to a light emitting diode on the client device. In some implementations, the message transmitted to the client device is an access request for access to a parental control setting on the client device. In some implementations, the message transmitted to the client device is an access request for access to a file system on the client device. In some implementations, the message transmitted to the client device is an access request for access to features of the client device.

The software application 430 is illustrated in FIG. 4 as a distinct software package that is executed on top of the application stack 440. In some implementations, the software application 430 may be integrated into the application stack 440, e.g., as part of the operating framework 448. The software application 430 may be packaged with the example client device 420, or may be installed separately, e.g., as a third-party application. The software application 430 may be a game, a utility, a tool, or any other software that the example client device 420 might execute.

In some implementations, the software application 430 includes a presentation object 470 for presenting content from a remote host server, e.g., from the preview host server 170. In some implementations, the software application 430 links to a presentation object 470 provided by the application stack 440, e.g., as part of the operating framework 448. The presentation object 470 receives, via the network 110, a media stream 434 from the preview host server 170 and facilitates interactive preview sessions by transmitting descriptions 436 of physical events to the preview host server 170. The presentation object 470 receives data from the kernel-level drivers 442 through the application stack 440 and packages the received data into descriptions of interaction events. The presentation object 470 then transmits the descriptions 436 to the preview host server 170 via the network 110. For example, in some implementations, the presentation object 470 sends a description 436 of a detected interaction that provides, to the preview host server 170, sufficient information to recreate the interaction, e.g., as input to a second application in a hosted environment on the preview host server 170. In some implementations, the example client device 420 captures, hooks, or intercepts signals from device interface 422 and sensors 426 on the example client device 420 and the presentation object 470 transmits (as descriptions 436 of physical events) raw values for the captured, hooked, or intercepted signal to the preview host server 170. In some implementations, the information transmitted to the preview host server 170 is packaged in a data structure. For example, the presentation object 470 may include additional contextual information in the data structure, e.g., a time value indicating when the interaction was detected. In some implementations, the presentation object 470 compresses the interaction description (or data structure including the interaction description) and transmits the interaction description 436 to the host server by transmitting the compressed information to the host server.

Figure 5:
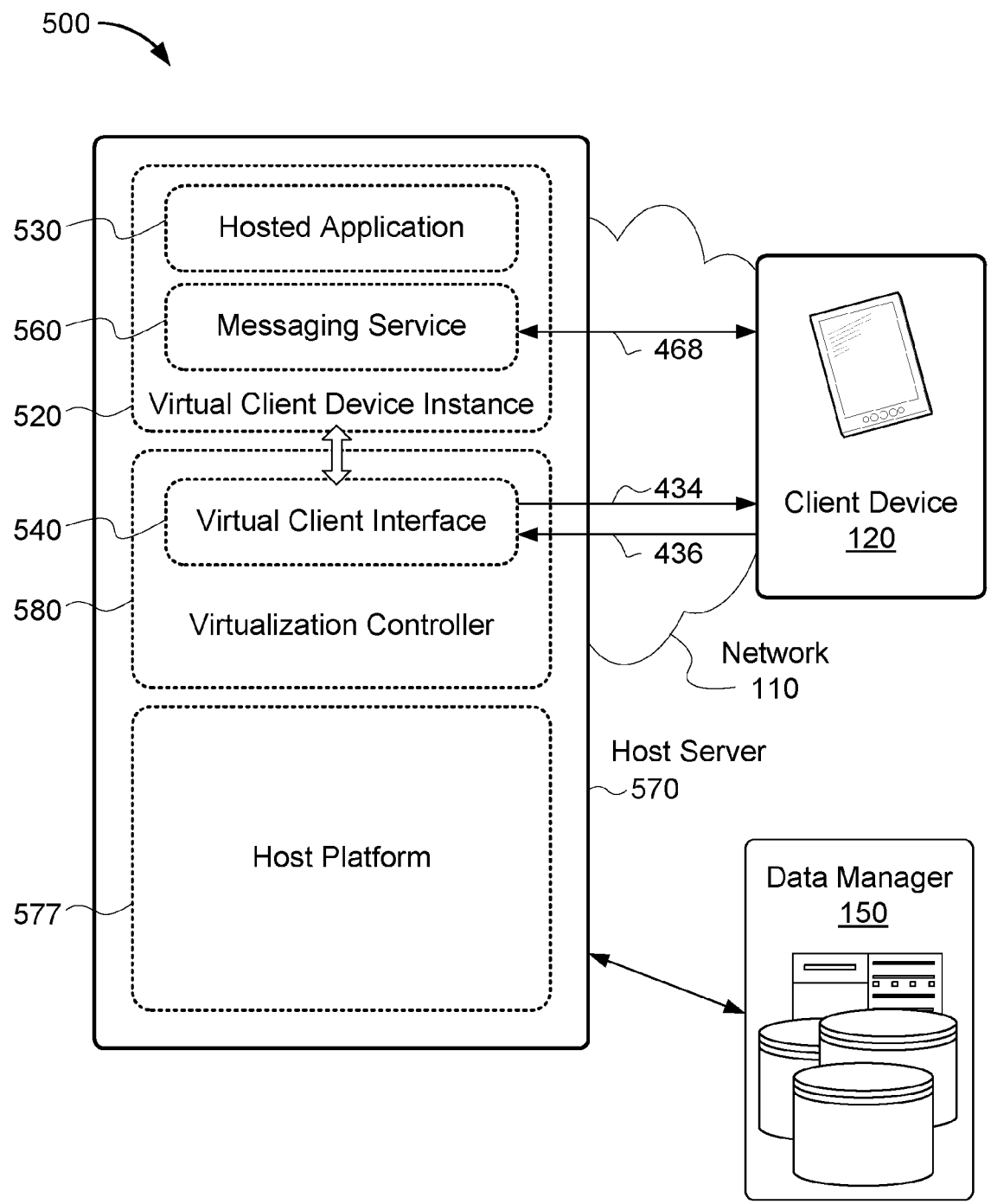
FIG. 5 is a diagram illustrating an example flow of data on a host server during an example interactive preview session.

FIG. 5 is a diagram 500 illustrating an example flow of data on a host server 570 during an example interactive preview session. In the description of FIG. 5, simulation of the client device 120 is illustrated in terms of virtualization; this is not meant to be limiting and, in some implementations, another method of simulation such as emulation is used. In the diagram 500, an example host server 570 (e.g., a preview host server 170) executes a hosted application 530 that is provided to a client device 120 in a preview session, e.g., as described above in reference to FIG. 3. In some implementations, the host server 570 is a client simulation server. The hosted application 530 executes on a virtual client device instance 520, which is a virtualized version of the client device 120 hosted by a virtualization controller 580. The virtualization controller 580 simulates media output devices (e.g., display screens, speakers, haptic feedback, and so forth) for the virtual client device instance 520, and includes a virtual client interface 540 that transmits a media stream 434 of the media output from the virtual client device instance 520 to the client device 120 via the network 110. The virtual client interface 540 receives, from the client device 120, descriptions 436 of physical events that are detected by the client device 120. The virtual client interface 540 converts the received event descriptions into input data that the virtualization controller 580 then uses to simulate the events for the virtual client device instance 520. In some implementations, the virtualization controller 580 runs on a host platform 577 that handles lower-level resource allocation on the host server 570. In some implementations, the host server 570 virtualizes multiple types of devices, e.g., using device images stored by the data manager 150. In some implementations, the virtual client device instance 520 provides, to the hosted application 530, a messaging service 560 for exchanging messages 468 with the client device 120. In some implementations, the messaging service 560 intercepts messages from the hosted application 530, such as inter-process requests and/or requests to the application stack of the virtual client device instance 520, and transmits the intercepted messages to a corresponding messaging service on the client device 120. The illustrated example architecture and flow of data is not meant to be limiting; alternative implementations may use different architectures.

The example host server 570 (e.g., a preview host server 170) is a computing device that hosts the virtual client device instance 520. In some implementations, the example host server 570 uses a hypervisor architecture to host the virtual client device instance 520. In some implementations, the example host server 570 uses emulation software to host the virtual client device instance 520. In some implementations, the example host server 570 simulates the application stack 440 (shown in FIG. 4) to provide an execution context for the hosted application 530, where the execution context is a substitute for the virtual client device instance 520. FIG. 10, described in more detail below, illustrates a computing device that, in some configurations, is suitable for use as an example host server 570.

In some implementations, the host server 570 executes a host platform 577 to manage hosting the virtual client device instance 520. The host platform 577 handles lower-level resource allocation on the host server 570, e.g., loading the virtualization controller 580, providing access to memory and computing processors, and so forth. In some implementations, the host server 570 virtualizes, or emulates, multiple types of devices, e.g., using device images stored by the data manager 150. The host platform 577 handles the low level tasks required to retrieve the device images from the data manager 150.

In some implementations, a hosted application 530 is executed on a virtual client device instance 520 without interaction with a corresponding client device 120. For example, a hosted application 530 may be loaded and executed up to a cue point, where execution of the application is then suspended and the application's state (e.g., memory and execution stack) are captured and recorded, e.g., to the data manager 150. In some implementations, the cue point is identified using an implementation of the method 800, described below in reference to FIG. 8. For versatility, the same hosted application 530 may be executed on a variety of virtualized devices, e.g., having different properties such as different screen sizes, different processor speeds, and/or different memory allocations. Each such instance of the hosted application 530 may be executed up to the cue point and an image of the corresponding virtualized device, with the suspended hosted application, may be stored, e.g., by the data manager 150. When providing a preview session to a client device 120, the host platform 577 retrieves an image of a virtualized device closely matching characteristics of the client device 120, and resumes the suspended hosted application thereon. An example of such an implementation is described in more detail below.

The host server 570 (e.g., a preview host server 170) includes a virtualization controller 580 that hosts a virtualized (or emulated) instance of the client device 120. In some implementations, the virtualization controller 580 is a virtual machine host (e.g., a hardware hypervisor, a software virtual machine host, or any other form of virtual machine host) for the client device 120 and hosts the virtual client device instance 520 as a virtualized instance of the client device 120. In some implementations, the virtualization controller 580 is a software emulator for the client device 120 and hosts the virtual client device instance 520 as an emulated instance of the client device 120. In some implementations, the example host server 570 simulates the application stack 440 (shown in FIG. 4) to provide an execution context for the hosted application 530, where the execution context is a substitute for the virtual client device instance 520. For example, in some implementations, the virtualization controller 580 provides an instance of a virtualized hardware abstraction layer (HAL) corresponding to the HAL 444 shown in FIG. 4, and the hosted application 530 is executed by the host server 570 on an application stack atop the virtualized HAL.

The virtualization controller 580 simulates media output devices (e.g., display screens, speakers, haptic feedback, and so forth) for the virtual client device instance 520. For example, in some implementations, the virtualization controller 580 may provide a graphics driver that appears to the virtual client device instance 520 as a graphics output device, but actually just records graphics instructions to a graphics buffer (e.g., a ring buffer). This buffer can then be transmitted to the client device 120. In some implementations, the virtualization controller 580 includes a virtual client interface 540 that transmits a media stream 434 of the media output from the virtual client device instance 520 to the client device 120 via the network 110, e.g., using the graphics buffer. The virtual client interface 540 receives, from the client device 120, descriptions 436 of physical events that are detected by the client device 120. The virtual client interface 540 converts the received event descriptions into input data that the virtualization controller 580 then uses to simulate the events for the virtual client device instance 520. For example, in some implementations, the virtual client interface 540 includes a device driver that appears to the virtual client device instance 520 as an input device; the virtual client interface 540 simulates the input device based on the descriptions 436 of physical events received from the client device 120.

In some implementations, the virtual client device instance 520 hosts a messaging service 560 for exchanging messages 468 with the client device 120. In some implementations, the messaging service 560 intercepts messages from the hosted application 530, such as inter-process requests and/or requests to the application stack of the virtual client device 520, and transmits the intercepted messages to a corresponding messaging service on the client device 120. In some implementations, the messaging service 560 receives messages from the client device 120 and provides the received messages to the hosted application 530. In some implementations, the messaging service 560 is provided by the virtualization controller 580.

The hosted application 530 is a software application executed on the virtual client device instance 520. In some implementations, the hosted application 530 is an application that could be installed on the client device 120 without any changes. In some implementations, the hosted application 530 alters execution behavior based on whether it is installed on a virtual client device instance 520 or on an actual client device 120. For example, in some implementations, responsive to detecting the presence of the messaging service 560, the hosted application 530 alters execution behavior to use the messaging service 560. In some implementations, the hosted application 530, while executing on the virtual client device instance 520 at the host server 570 is presented at the client device 120 as though executing locally at the client device 120.

Figure 6:
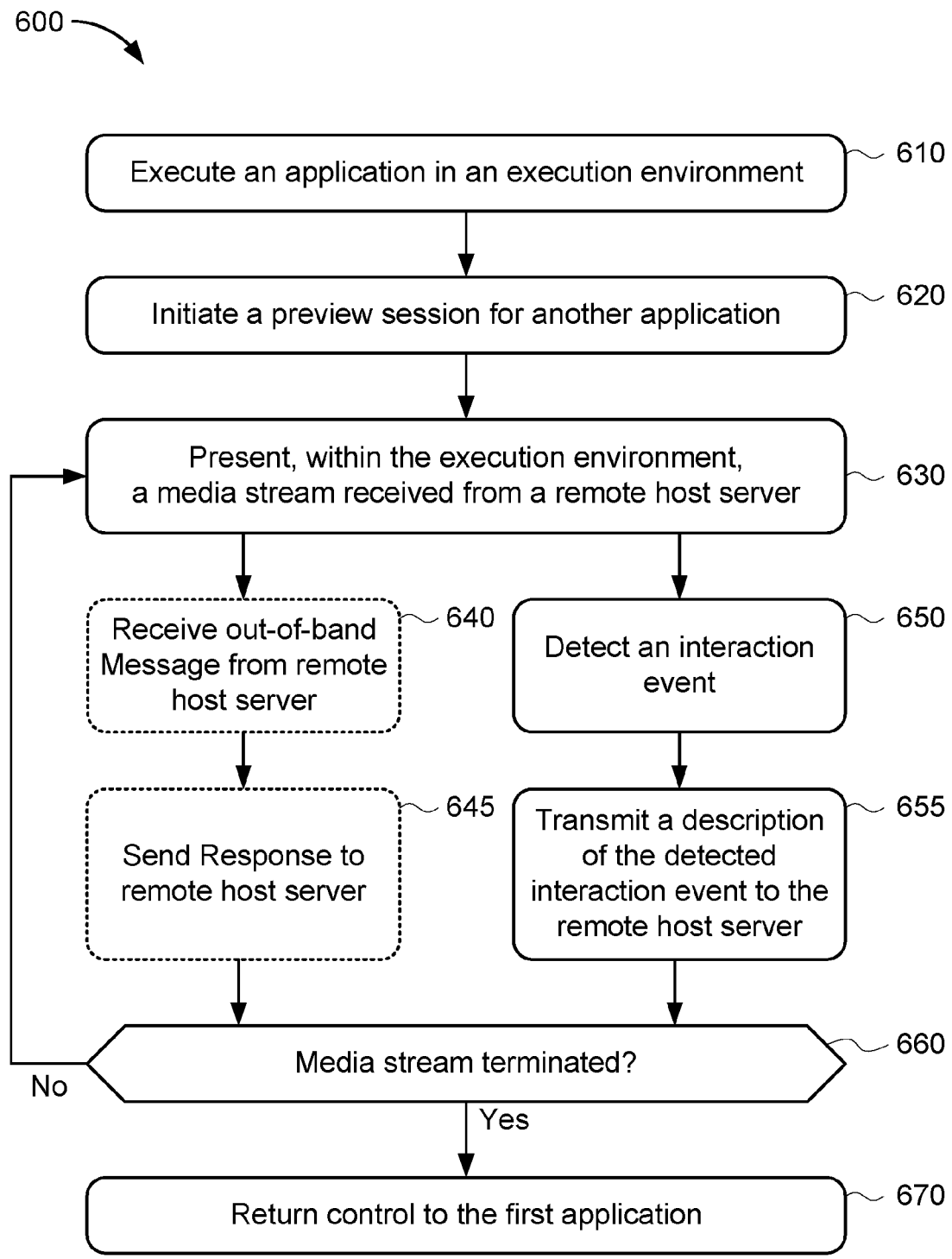
FIG. 6 is a flowchart for an example implementation of a method of providing a preview session at a client device.

FIG. 6 is a flowchart for an example implementation of a method 600 of providing a preview session at a client device 120. In broad overview of the method 600, at stage 610, the client device 120 executes an application in an execution environment. At stage 620, the client device 120 initiates a preview session for another application. In some implementations, the preview session is provided within the same execution environment as the application. At stage 630, the client device 120 presents, within the execution environment, a media stream 434 received from a remote host server 570. In some implementations, the remote host server 570 and the client device 120 establish a side channel for exchanging messages 468 for side-band communication (i.e., communication outside of the channels used for transmitting the media stream 434 and the descriptions 436 of physical events detected by the client device 120). In such implementations, at stage 640, the client device 120 receives a side-band message from the remote host server 570, and at stage 645, the client device 120 sends a response to the remote host server 570. At stage 650, the client device 120 detects an interaction event and, at stage 655, the client device 120 transmits a description 436 of the detected interaction event to the remote host server 570. At stage 660, if the media stream has not terminated, the method 600 returns to stage 630 and continues the presentation. Otherwise, if at stage 660 the media stream has terminated, then at stage 670 the client device 120 returns execution control to the first application. That is, the preview session ends.

Referring to FIG. 6 in more detail, at stage 610, the client device 120 executes an application in an execution environment. For example, referring to FIG. 4, in some implementations, the client device (e.g., the client device 120 in FIG. 1 or the client device 420 in FIG. 4) executes a software application 430 on an application stack 440. In some implementations, the application is a third-party application installed on the client device. In some implementations, the application is included with software components provided natively with the client device. In stage 610, the application is executed on the client device 120, e.g., responsive to an application launch request from a user. The application executes on the client device and reaches an execution point at which a preview session is to be provided. In some implementations, the application requests the preview session. In some implementations, the application presents content and the content includes an element that triggers a request for the preview session. For example, in some implementations, the application presents content received via a network such as a webpage, an electronic document, a video or multi-media presentation, a game, etc. In some implementations, when a preview session is to be provided, the application switches to a presentation mode or launches a presentation object 470.

At stage 620, the client device 120 initiates a preview session for another application. In some implementations, initiating the preview session includes sending a request to a preview distribution server 140 to identify content for the preview session. In some implementations, the preview session begins with a request to a preview host server 170 to provide content. In some implementations, the request identifies content to be provided. The client device 120 prepares to present the requested content. For example, in some implementations, when a preview session is to be provided, the application switches to a presentation mode or launches a presentation object 470. In some implementations, the client device 120 instantiates a messaging service 460. For example, in some implementations, the client device 120 starts a service listening for incoming messages on a predetermined port number and provides an application interface that the application 430 can use to send and retrieve messages via the messaging service. In some implementations, the client device 120 receives initiation data from the preview host server 170 to initiate the preview session. For example, in some implementations, the client device 120 receives a session identifier for the preview session.

At stage 630, the client device 120 presents, within the execution environment, a media stream 434 received from a remote host server 570. In some implementations, the media stream 434 includes video image data. In some implementations, the media stream 434 includes audio data. In some implementations, the media stream 434 includes haptic feedback data. In some implementations, the media stream 434 is formatted or encoded in accordance with a Moving Picture Experts Group (MPEG) standard such as MPEG-4, MPEG Dynamic Adaptive Streaming over the HyperText Transport Protocol (MPEG-DASH), or MPEG transport stream (MPEG-TS). In some implementations, the media stream 434 is formatted or encoded in accordance with a different standard. In some implementations, the media stream 434 is formatted or encoded in accordance with a custom formatting or encoding scheme.

In some implementations, the remote host server 570 and the client device 120 establish a side channel for exchanging messages 468 for side-band communication (i.e., communication outside of the channels used for transmitting the media stream 434 and the descriptions 436 of physical events detected by the client device 120). In such implementations, at stage 640, the client device 120 receives a side-band message from the remote host server 570.

In some implementations, the message transmitted to the client device 120 at stage 640 is an access request for client device access. In some implementations, the message transmitted to the client device 120 at stage 640 is an access request for access to system configuration data on the client device. In some implementations, the message transmitted to the client device 120 at stage 640 is an access request for access to an audio sensor on the client device. In some implementations, the message transmitted to the client device 120 at stage 640 is an access request for access to an image sensor on the client device. In some implementations, the message transmitted to the client device 120 at stage 640 is an access request for access to a biometric sensor on the client device. In some implementations, the message transmitted to the client device 120 at stage 640 is an access request for access to a light emitting diode on the client device. In some implementations, the message transmitted to the client device 120 at stage 640 is an access request for access to a parental control setting on the client device. In some implementations, the message transmitted to the client device 120 at stage 640 is an access request for access to a file system on the client device. In some implementations, the message transmitted to the client device 120 at stage 640 is an access request for access to features of the client device.

At stage 645, the client device 120 sends, to the remote host server 570, a response to the message sent in stage 640. In some implementations, the response includes information requested in the message. In some implementations, the response sent in stage 645 is a stream or series of messages. For example, in some implementations, the request may be a request for access to a client device sensor, e.g., a microphone, an image sensor, a camera, etc., and the response in stage 645 is a series of data messages with data from the client device sensor. In some implementations, the hosted application uses data received from these side-band messages to generate the media stream. For example, the application might be an image editor that allows editing a picture taken from a camera on the client device.

In some implementations, the access request at stage 640 causes the client device 120 to obtain additional authorization from a user. For example, in some implementations, the client device 120 is caused to display an authorization screen, process an authorization, and, responsive to the processed authorization, provide an access granted indicator back to the host server in stage 645. The authorization screen solicits user input to authorize the access request. In some implementations, the authorization screen includes a soft button that the user may select to provide authorization. In some implementations, a security key such as a pin number or biometric screen (e.g., thumb print or iris scan) is required to complete the authorization. The client device 120 processes the user input to determine if the request is authorized. In some implementations, if the application executed in stage 610 (the host application) has an authorization, then the remote application presented in the preview session is automatically granted the same authorization. In some implementations, the remote application is not automatically granted an authorization even if the host application has the authorization. For example, the host application may have authorization to access an image sensor or camera device built into the client device; in some implementations, this authorization transfers to the remote application, and in some implementations, this authorization does not transfer to the remote application. Accordingly, in some implementations, the remote application needs to obtain authorization separately from the host application. The remote application may do so using side-band messages received by the client device at stage 640.

In some implementations, the access request at stage 640 is a request for access to configuration data, user settings, an application store, or some other feature on the client device 120 where an administrative user manages user access limitations. The access request can be used to determine if a user is prohibited from receiving certain content, e.g., due to parental settings or age restrictions.

At stage 650, the client device 120 detects an interaction event and, at stage 655, the client device 120 transmits a description 436 of the detected interaction event to the remote host server 570. In some implementations, an event handler on the client device 120 detects an interaction event. While the client device 120 is presenting the media steam received in stage 630, an event handler on the client device detects interaction events, e.g., user attempts to interact with the client device 120. In some implementations, the interaction event is a tactile input event such as a screen tap, a button depression, a button release, or a mouse click. In some implementations, the interaction event is a change in a configuration for the client device 120, e.g., an increase, decrease, or muting of the device audio volume settings. In some implementations, the interaction event is a screen lock event or cover close event. In some implementations, the interaction event is a device movement event detected by a motion sensor on the client device 120. For example, the client device 120 may include an accelerometer, a gyroscope, a tilt-sensor, or any other type of motion sensor. The event handler detects the input, e.g., the tactile input or device movement, and processes it as an interaction event. In some implementations, a separate event monitor hooks or intercepts the interaction event. In some implementations, the event handler includes the event monitor.

At stage 655, the client device 120 transmits a description 436 of the detected interaction event to the remote host server 570. In some implementations, the client device 120 transmits data representative of the detected interaction. In some implementations, the client device 120 transmits a data structure including data representative of characteristics of the interaction. For example, if the interaction is a screen tap, the data structure may include fields indicating screen coordinates of the tap, a length of time for the tap, a pressure applied during the tap, a measurement of the tap geometry, and so forth. In some implementations, the client device 120 includes internal data representations in the transmitted data. For example, if a device driver reports an interaction event in a particular format, the client device 120 transmits the report in the particular format to the remote host server 570. The client device 120 transmits the description 436 of the detected interaction event to the remote host server 570 in a manner that enables the remote host server 570 to recreate the interaction event.

At stage 660, if the media stream has not terminated, the method 600 returns to stage 630 and continues the presentation. A preview session may terminate, for example, when a pre-determined length of time has elapsed, when the second application terminates, or when the client device requests early termination, e.g., as a result of a user selecting an escape button. In some implementations, the client device receives a signal from the host server indicating that the preview session has terminated. In some implementations, the client device generates and sends a signal to the host server indicating that the preview session has terminated.

If at stage 660 the media stream has terminated, then at stage 670 the client device 120 returns execution control to the first application. That is, the preview session ends. In some implementations, any memory reserved by the client device for the preview session is released.

Figure 7:
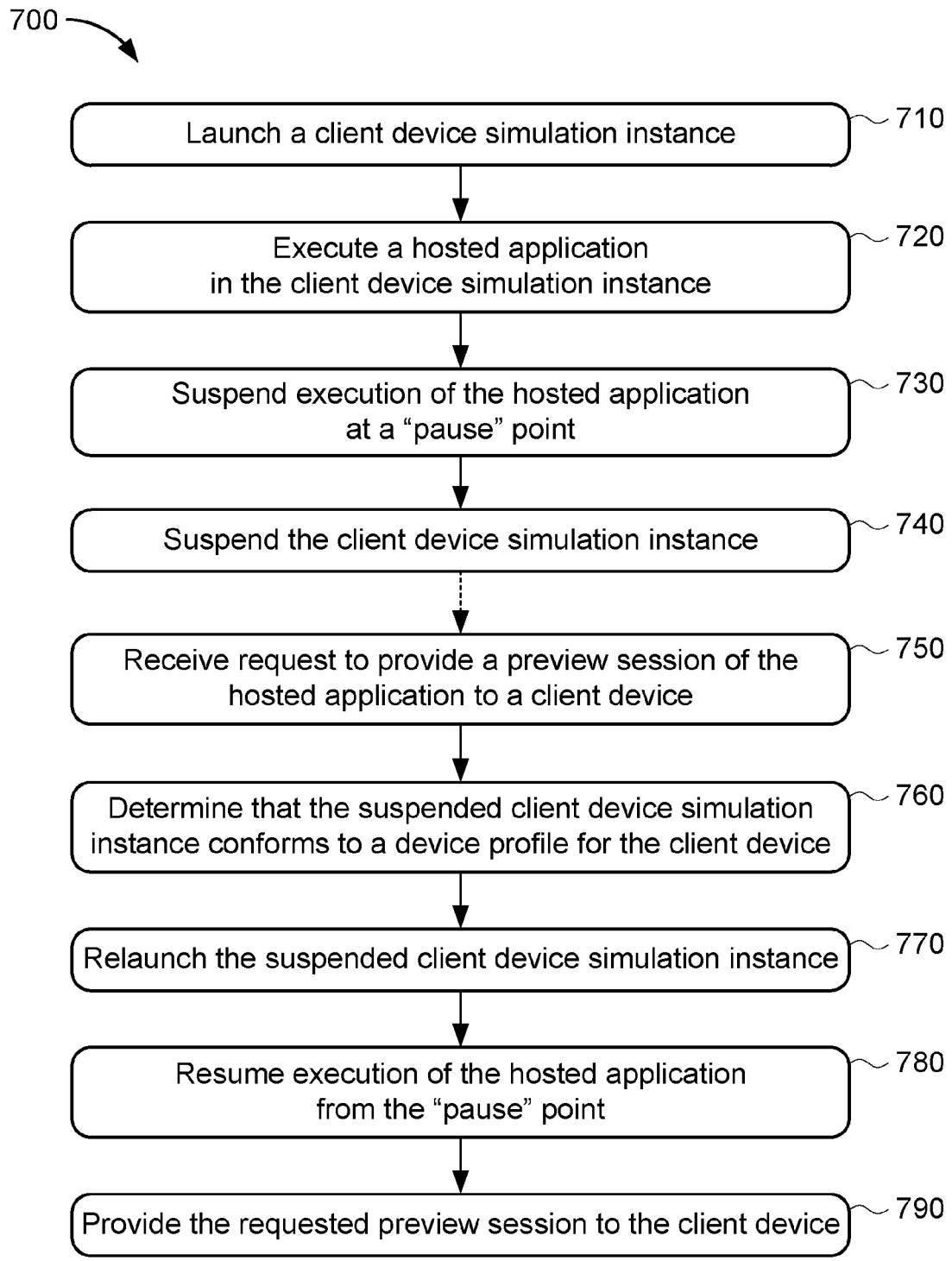
FIG. 7 is a flowchart for an example implementation of a method of pre-cueing an application for use in providing a preview session.

FIG. 7 is a flowchart for an example implementation of a method 700 of pre-cueing an application for use in providing a preview session. In broad overview of the method 700, at stage 710, a host server 570 launches a client device simulation instance and, at stage 720, executes a hosted application in the client device simulation instance. At stage 730, the host server 570 suspends execution of the hosted application at a cue point and, at stage 740, suspends the client device simulation instance. In some implementations, the cue point is identified using an implementation of the method 800 described below in reference to FIG. 8. Then, at stage 750, the host server 570 receives a request to provide a preview session of the hosted application to a client device. At stage 760, the host server 570 determines that the suspended client device simulation instance conforms to a device profile for the client device. At stage 770 the host server 570 relaunches the suspended client device simulation instance, and at stage 780 the host server 570 resumes execution of the hosted application from the cue point (where it had been previously suspended in stage 730).

Then, at stage 790, the host server 570 provides the requested preview session to the client device 120 (responsive to the request received in stage 750).

Referring to FIG. 7 in more detail, at stage 710, a host server 570 launches a client device simulation instance. In some implementations, the host server 570 runs a simulated version of the client device 120. For example, in some implementations, the host server 570 is a hypervisor running a virtual machine from an image of the client device 120. The virtual machine is a virtualized version of the client device 120, i.e., a simulation of the client device 120. In some implementations, the host server 570 executes an emulator for the client device 120, providing an emulated client device 120 as a simulation of the client device. In some implementations, the host server 570 launches the device simulation instance from data stored by the data manager 150, e.g., from a virtual machine image.

At stage 720, the host server 570 executes a hosted application in the client device simulation instance. In some implementations, the host server 570 installs the hosted application from data stored by the data manager 150. In some implementations, the hosted application is installed in a machine image used to launch the client device simulation in stage 710. At stage 720, the host server 570 executes the hosted application and monitors the execution for a cue point.

At stage 730, the host server 570 suspends execution of the hosted application at the cue point. In some implementations, the cue point is identified using an implementation of the method 800 described below in reference to FIG. 8. For example, the application may be executed until the application is ready for user interactions. As described in more detail below, this may be detected when a user option is first presented by the hosted application. In some implementations, the cue point is a length or extent of time for which the application has been executed. After executing the application for the designated extent of time (at stage 720), then at stage 730 the host server 570 suspends execution. In some implementations, the host server 570 suspends execution of the hosted application by sending a signal or interrupt to the hosted application, e.g., requesting that the application pauses. In some implementations, the hosted application is in a stable state at the cue point, awaiting user input. In some implementations, the host server 570 generates a record of the memory utilization and execution stack for the hosted application at the cue point, where the generated record can be later used to restore the application to the same execution state. In some implementations, stage 730 is skipped and, when the host server 570 determines that the hosted application has reached a cue point, proceeds to stage 740 and suspends the client device simulation instance.

At stage 740, the host server 570 suspends the client device simulation instance. In some implementations, the host server 570 places the client device simulation instance into a suspended state (e.g., a sleep or hibernation mode) and captures the memory state of the client device simulation instance. In some implementations, capturing the memory state includes capturing the state of cache and system memory for the client device simulation instance. The captured memory may include, for example, data in processor registers, data in an instruction execution stack, data from cache, and so forth. In some implementations, the host server 570 places the client device simulation instance into a stable state prior to the memory capture. The host server 570 then stores the captured memory state, e.g., using the data manager 150.

In some implementations, a client device simulation, e.g., a virtual client device instance 520, opens a streaming session on start-up. The client device simulation is configured to automatically execute the hosted application 530 on start-up and run the hosted application 530 for a pre-determined extent of time. The pre-determined extent of time may be a cue point, a typical latency measured from past presentations, an offset from the typical measured latency, a configured length of time, or some other extent of time. In some implementations, the client device simulation then captures a screenshot of graphics output from the hosted application 530 and uses image recognition, optical character recognition, machine learning techniques, computer vision, pattern recognition, and the like to identify interactive elements presented in the screenshot. In some implementations, the host server 570 collects tap coordinates in the interaction event data and determines a screen location that is most commonly tapped. The host server 570 then simulates a tap for the client device simulation on the identified interactive element or at the identified most commonly tapped location. The simulated tap (or click) is a simulated interaction with the hosted application 530. The host server 570 then suspends execution of the client device simulation and saves an image of the suspended simulation for future use, e.g., at the data manager 150.

At stage 750, the host server 570 receives a request to provide a preview session of the hosted application to a client device. There may be a significant time gap between stage 740 and stage 750. In some implementations, the host server 570 may perform multiple iterations of stages 710, 720, 730, and 740, creating and storing multiple memory state captures, e.g., for different hosted applications and/or simulations of different client devices, each with its own device profile associated with device-specific characteristics such as screen size, chip set, memory allocation, operating system, available peripherals, etc. At stage 750, the host server 570 receives a request to provide a preview session of the hosted application to a client device. In some implementations, the received request includes information specifying or identifying the hosted application to preview. In some implementations, the received request includes information specifying or identifying one or more characteristics of the client device. In some implementations, the host server 570 receives information from the client device identifying a device-specific profile.

At stage 760, the host server 570 determines that the suspended client device simulation instance conforms to a device profile for the client device. In some implementations, the host server 570 assigns a device profile to the requesting client device based on the specified or identified characteristics. The device profile describes features and attributes of the client device. The host server 570 assigns the client device a profile that best corresponds to the client device. In some implementations, the host server 570 receives information from the client device identifying a specific device profile. At stage 760, the host server 570 identifies a suspended client device simulation instance that conforms to the characteristics of the requesting client device.

At stage 770 the host server 570 relaunches the suspended client device simulation instance. That is, having determined in stage 760 that the client device simulation instance suspended in stage 750 conforms to the characteristics of the requesting client device, at stage 770 the host server 570 relaunches (or resumes execution of) the suspended client device simulation instance. In some implementations, the host server 570 retrieves data from the data manager 150 representative of the suspended client device simulation instance and relaunches the suspended client device simulation instance from the retrieved data. In some implementations, the host server 570 resumes execution of the suspended client device simulation instance from a sleep or hibernate state.

At stage 780, the host server 570 resumes execution of the hosted application from the cue point at which it had been previously suspended in stage 730. In implementations where the hosted application is suspended separately from the client device simulation instance, the host server 570 restores the suspended hosted application. The hosted application was suspended in stage 730 at a cue point, so at stage 780 it can be resumed from the cue point. The hosted application is effectively pre-cued to the cue point, and ready for resumption at stage 780.

At stage 790, the host server 570 provides the requested preview session to the client device 120 (responsive to the request received in stage 750). Output from the resumed execution of the pre-cued hosted application is transmitted by the host server 570 to the client device 120 via the network 110. For example, in some implementations, the hosted application generates output data to an audio and/or a video graphics buffer and the host server 570 transmits a media stream of the contents of the buffers. In some implementations, a virtual client interface 540 streams the media content to the client device 120 and receives, from the client device 120, data descriptive of interaction events. The virtual client interface 540 recreates the interaction events for the hosted application at the client device simulation instance. In some implementations, the host server 570 provides the preview session using the method 600 described above in reference to FIG. 6.

Figure 8:
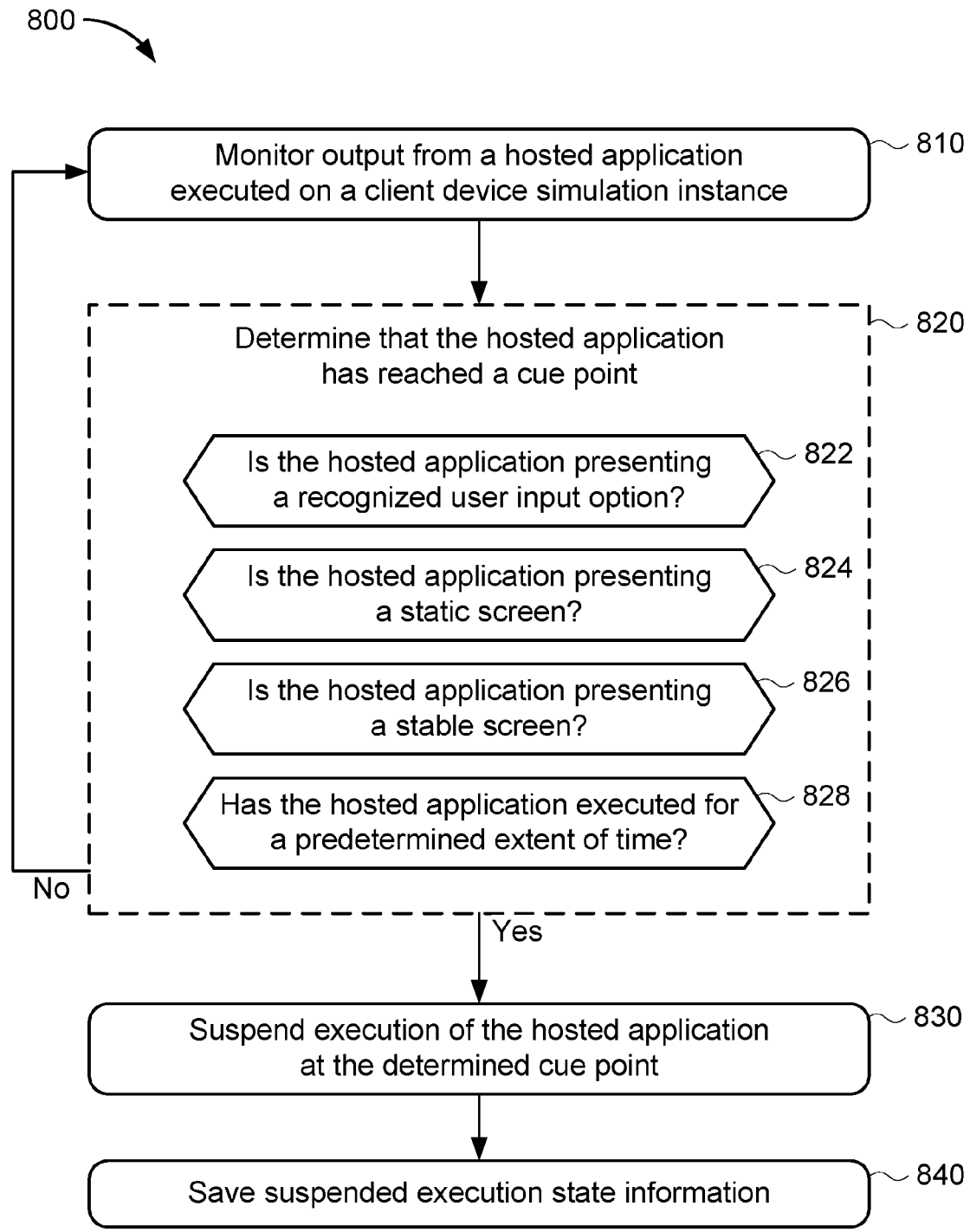
FIG. 8 is a flowchart for an example implementation of a method of identifying a cue point at which to pre-cue an application for use in providing a preview session.

FIG. 8 is a flowchart for an example implementation of a method 800 of identifying a cue point at which to pre-cue an application for use in providing a preview session. Generally, in most implementations, the preferred cue point is a first moment during application execution at which the application is ready for user interaction. In some implementations, an alternative cue point is used, e.g., a point at which an introductory presentation is fully cued and ready to present to a user. In broad overview of the method 800, at stage 810, a host server 570 monitors output from a hosted application executed on a client device simulation instance. At stage 820, the host server 570 determines that the hosted application has reached a cue point. FIG. 8 illustrates four example determination branches 822, 824, 826, and 828, described in more detail below. These example determination branches may be implemented individually or in any combination or order, and are provided as examples. Other determination branches can be used and the four illustrated are not meant to be limiting. Continuing with the overview of the method 800, at stage 830, the host server 570 suspends execution of the application at the determined cue point and, at stage 840, the host server 570 saves suspended execution state information for the suspended hosted application. For example, the host server 570 may transmit the suspended execution state information to a data storage system 150.

Referring to FIG. 8 in more detail, at stage 810, a host server 570 monitors output from a hosted application executed on a client device simulation instance.

At stage 820, the host server 570 determines that the hosted application has reached a cue point. FIG. 8 illustrates four example determination branches 822, 824, 826, and 828, which may be implemented individually or in any combination or order. In brief overview, the four examples are: a branch 822 based on determining whether the hosted application is presenting a recognized user input option; a branch 824 based on determining whether the hosted application is presenting a static screen; a branch 826 based on determining whether the hosted application is presenting a stable screen (e.g., a looping animation); and a branch 828 based on determining whether the hosted application has executed for a predetermined extent of time. These are examples, other determination branches can be used and the four illustrated are not meant to be limiting.

Many determination branch strategies use analysis of a screen capture. In some implementations, the host server 570 periodically captures images of a graphics output from the hosted application (a "screen capture") and analyzes the screen captures. In some implementations, the screen capture is representative of what a display screen would look like if it existed, e.g., based on a graphics buffer for the client device simulation instance. That is, the screen capture does not require an actual screen or presentation interface. In some implementations, the screen capture is a comprehensive image of the screen. In some implementations, the screen capture is a sampling of a sub-set of the screen representative of the screen status. In some implementations, the screen capture is held in memory in an image file format such as the JPEG, GIF, BMP, PNG, or TIFF image file formats. In some implementations, the data corresponding to the state of a screen is a sampling of pixel states for a subset of display pixels. The sampling may be of specific pixels selected as a representative subset of the overall screen display. In some implementations, an event handler (or event monitor) on the client device periodically performs the screen capture. Status information for a pixel may include, for example, a color value, hue, contrast, brightness, saturation, and so forth. The color value may be a red-green-blue (RGB) value, a cyan-magenta-yellow-key (CMYK) value, a Chroma-based "YCbCr" or "Y'CbCr" value, a PANTONE value, or a color value using any other color value scheme. A set of pixels used in sampling may be a predetermined set of pixels. In some implementations, the set of pixels is initially selected at random, but the same set of pixels is used throughout analysis of a hosted application. The screen capture may be representative of an application load screen, a video or media presentation, a graphical user interface (GUI), or anything else a hosted application might present.

Using branch 822 at stage 820, the host server 570 determines that the hosted application has reached a cue point based on determining whether the hosted application is presenting a recognized user input option. In some implementations, the host server 570 periodically captures a screen capture and analyzes the screen capture for recognized user input options. In some implementations, the host server 570 uses optical character recognition (OCR) techniques on a screen capture to identify soft button labels such as "start," "begin," "play," "enter," and so forth. For example, the example splash screen GUI 240 shown in FIG. 2C includes a "start" button 245, and the label on the button 245 (which reads "start") may be recognized via OCR as a user input option. In some implementations, the host server 570 uses image recognition, optical character recognition, machine learning techniques, computer vision, pattern recognition, and the like to identify images or icons such as a right-facing triangle or arrow. In some implementations, the host server 570 maintains a directory of common user input options and analyzes output from the hosted application for image elements conforming to a common user input option from the directory. In some implementations using branch 822 at stage 820, when the host server 570 determines that the hosted application is presenting a recognized user input option, the host server 570 determines that the hosted application has reached a cue point.

Using branch 824 at stage 820, the host server 570 determines that the hosted application has reached a cue point based on determining whether the hosted application is presenting a static screen. In some implementations, the host server 570 periodically captures a sequence of screen captures and analyzes the sequence of screen captures to determine if there are any differences between the screen captures. If there are no differences between the screen captures over a threshold length of time, the host server 570 determines that the hosted application is presenting a static screen. In some implementations, if the extent of the differences between the screen captures is below a threshold amount (e.g., less than 1% of the presentation is changing between screen captures), the host server 570 determines that the hosted application is presenting a static screen. In some implementations, the host server 570 distinguishes between a blank screen and a static screen. If the screen capture is effectively uniform in color, saturation, brightness, or some other characteristic, the host server 570 may classify it as a blank screen. In some implementations, the host server 570 requires a minimum characteristic diversity in a screen capture in order to qualify it as a static screen. In some implementations using branch 824 at stage 820, when the host server 570 determines that the hosted application is presenting a static screen, the host server 570 determines that the hosted application has reached a cue point.

Using branch 826 at stage 820, the host server 570 determines that the hosted application has reached a cue point based on determining whether the hosted application is presenting a stable screen (e.g., a looping animation). In some implementations, the host server 570 periodically captures a sequence of screen captures and analyzes the sequence of screen captures to determine if there are repetitions of the screen captures or screen capture sequences. If there is a repeated sequence over a threshold length of time, the host server 570 determines that the hosted application is presenting a loop. If the loop persists, e.g., for a threshold length of time or a threshold number of repetitions, then the host server 570 determines that it is a stable screen. In some implementations using branch 826 at stage 820, when the host server 570 determines that the hosted application is presenting a stable screen, the host server 570 determines that the hosted application has reached a cue point. In some such implementations, the host server 570 identifies a first point at which the stable screen presents (e.g., the beginning of an animation loop), and the cue point is the identified first point. In some such implementations, the host server 570 identifies any point during presentation of the stable screen (e.g., the point in time at which the presentation is determined to be a loop), and the cue point is the identified point.

Using branch 828 at stage 820, the host server 570 determines that the hosted application has reached a cue point based on determining whether the hosted application has executed for a predetermined extent of time. In some implementations, the host server 570 executes the hosted application for a number of seconds (or fractions of seconds) and proceeds to stage 830 to suspend execution of the application after the predetermined extent of time. In some implementations, the predetermined extent of time is fixed. In some implementations, the predetermined extent of time is configurable. In some implementations, the predetermined extent of time is application specific. For example, a source of the hosted application (e.g., an application author, vendor, distributor, etc.) may provide an estimated loading latency or "time to load" for use as the cue point. In some implementations, the predetermined extent of time is determined by experiment. For example, as described below in reference to FIG. 9, in some implementations, the hosted application is presented to a number of client devices 120 and the host server 570 measures a length of time from initial presentation to a first interaction for each presentation. These measurements are then used to identify a typical delay time, which can then be used as the extent of time for a cue point. In some such implementations, the process is iterative. That is, the measurements may be collected for presentation of previously-suspended applications and the accuracy of the cue point can thus be automatically refined over time. In some implementations using branch 828 at stage 820, when the host server 570 determines that the hosted application has executed for a predetermined extent of time, the host server 570 determines that the hosted application has reached a cue point.

Continuing with the details of the method 800, at stage 830, the host server 570 suspends execution of the application at the determined cue point. As described above, in reference to stage 730 and stage 740 in FIG. 7, the host server 570 captures data representative of the memory state for the client device simulation and the application hosted on the client device simulation at the cue point. For example, in some implementations, the host server 570 places the client device simulation in a hibernation state or in a sleep state, and records an image of the simulation in the hibernation or sleep state.

At stage 840, the host server 570 saves suspended execution state information for the suspended hosted application. For example, the host server 570 may transmit the suspended execution state information to a data storage system 150.

Figure 9:
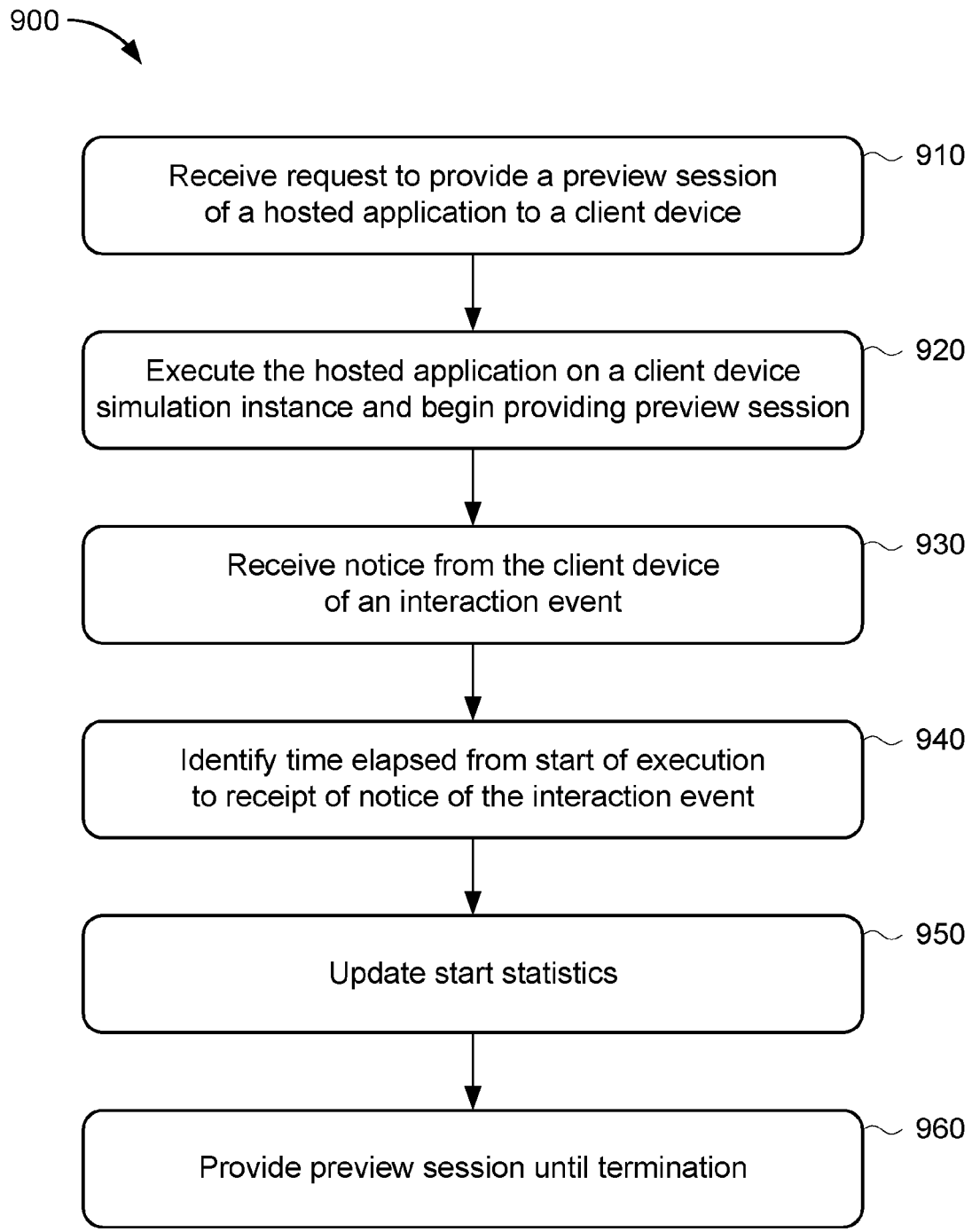
FIG. 9 is a flowchart for an example implementation of an objective method of identifying an application-specific execution time-based cue point at which to pre-cue an application for use in providing a preview session.

FIG. 9 is a flowchart for an example implementation of an objective method 900 of identifying an application-specific execution time-based cue point at which to pre-cue an application for use in providing a preview session. The method 900 is for a single sample out of possibly many sampling instances. Each sampling instance can contribute to a collection of start statistics representative of when users first engage with content provided as described herein. In broad overview of the method 900, at stage 910, a host server 570 receives a request to provide a preview session of a hosted application to a client device 120. At stage 920, the host server 570 executes the hosted application on a client device simulation instance and begins to provide the preview session to the client device 120. At stage 930, the host server 570 receives notice from the client device 120 of an interaction event. At stage 940, the host server 570 identifies an amount of time elapsed from start of execution to receipt of the notice in stage 930. At stage 950, the host server 570 updates start statistics and at stage 960 the host server 570 continues to provide the preview session until termination.

Referring to FIG. 9 in more detail, at stage 910, a host server 570 receives a request to provide a preview session of a hosted application to a client device 120. In some implementations, the received request includes information specifying or identifying the hosted application to preview. In some implementations, the received request includes information specifying or identifying one or more characteristics of the client device. In some implementations, the host server 570 receives information from the client device identifying a device-specific profile.

At stage 920, the host server 570 executes the hosted application on a client device simulation instance and begins to provide the preview session to the client device 120. In some implementations, the host server 570 selects the client device simulation instance with characteristics similar to those of the client device, e.g., based on a client device profile. In some implementations, the host server 570 executes the hosted application from an initial "fresh" state, e.g., from a clean installation of the hosted application into the client device simulation instance. In some implementations, the host server 570 executes the hosted application from a pre-cued suspended state. In some such implementations, the host server 570 identifies an execution time elapsed for the pre-cued suspended state, i.e., an extent of time the application executed prior to being suspended. The host server 570 provides the application to the client device in a preview session, e.g., as described above in reference to FIG. 6.

At stage 930, the host server 570 receives notice from the client device 120 of an interaction event. For example, as described above in reference to stage 655 in FIG. 6, in some implementations, the client device 120 transmits a description 436 of a detected interaction event to the host server 570. In some implementations, the client device 120 transmits data representative of the detected interaction. In some implementations, the client device 120 transmits a data structure including data representative of characteristics of the interaction. In some implementations, the client device 120 includes internal data representations in the transmitted data. The first time that a user of the client device 120 attempts to interact with the application may indicate a first time at which the application is ready for interaction. Accordingly, in some implementations, this first interaction is used to measure a length of time from the beginning of execution of the application to when the application is ready for user interaction.

At stage 940, the host server 570 identifies an amount of time elapsed from start of execution to receipt of the notice in stage 930. In some implementations, the start of execution corresponds to the start of executing the hosted application from an initial fresh install of the application on the client device simulation instance. In some implementations, stage 920 resumes the hosted application from a partially executed suspended state. In some such implementations, the amount of time elapsed from start of execution includes the amount of time that the application executed prior to being suspended.

At stage 950, the host server 570 updates start statistics. In some implementations, the start statistics are a collection of time lengths from which an average time length can be calculated. For example, in some implementations, the collection of time lengths is a table of observed time lengths and a number of times each time length was observed. A mean, median, mode, trimmed mean, or other statistical generalization can be calculated from the collection of time lengths. In some implementations, the start statistics are a pair of counters, one counter for the number of measurements (n), and another counter for a running mean of the measurements (d). A new measurement (x) is added to the running mean (d) as (ng+x)/(n+1).

In some implementations, the start statistics include an image representation of the screen display (a screenshot) at the time of the interaction. The host server 570 captures the image at the time of the interaction and updates the start statistics with the image. In some implementations, the host server 570 only records the screenshot if the timing of the interaction event is within a range or cluster of previous measurements. That is, the image is only recorded if there is a sufficient threshold likelihood that the measurement is useful. In some implementations, the range is a time-window of a fixed number of seconds before and after an average time for a first interaction event. In some implementations, the image is recorded if the timing is above a first threshold percentile, below a second threshold percentile, or between a first and second percentile of previously observed first interactions. For example, in some implementations, the image is recorded if the timing is within 5 seconds of a timing at the 80th percentile. In some implementations, the image is analyzed, e.g., using image recognition, optical character recognition, machine learning techniques, computer vision, pattern recognition, and the like, to identify interactive elements such as a start button. In some implementations, the host server 570 records display coordinates corresponding to a touch interaction event, the timing of the touch interaction event relative to the presentation, and a screenshot of the display corresponding to the touch event. In some implementations, the host server 570 includes in the start statistics a score corresponding to a likelihood that the interaction event was responsive to presentation of an interaction element. That is, the score indicates how likely it is that the interaction event corresponds to the application being ready for interaction, e.g., based on whether the host server 570 identified an interactive element. In some implementations, the host server 570 further evaluates whether the interaction event is at coordinates corresponding to the identified interactive element. In some implementations, the score is a confidence value for a machine recognition of an interactive element.

An application may take longer to load on some client device simulations than on others, e.g., as a function of screen size, processor attributes, memory allocations, etc. In some implementations, the start statistics are retained for specific client device simulation instances.

At stage 960 the host server 570 continues to provide the preview session until termination. In some implementations, the host server 570 only updates statistics for the first detected interaction. After that, the preview session is provided essentially as described above in reference to FIG. 6. In some implementations, the host server 570 collects additional interaction statistics. For example, if the application was not ready for interaction, the first user attempt at interaction may have been ignored. Accordingly, in some implementations, the host server 570 collects statistics for additional interactions and identifies a first cluster of interaction events as corresponding to application availability.

In some implementations, the host server 570 uses the first-interaction statistics gathered by the method 900 to identify a cue point for pre-cueing the hosted application. In some such implementations, the host server 570 identifies an average length of time from the beginning of application execution until a first interaction event. In some implementations, the host server 570 calculates a trimmed mean from the first-interaction statistics, omitting a pre-defined percentage of outlier statistics. In some implementations, the host server 570 calculates a length of time from the beginning of application execution until the beginning of a cluster of first interaction events. In some implementations, the host server 570 identifies a length of time that is at a predefined (e.g., 80th) percentile of the measured lengths-of-time to first interaction. The identified cue point is an estimate for the application's load latency, and may be used to pre-cue the application for future presentations, e.g., as described above in reference to FIG. 7.

In at least one example implementation, a host server 570 provides a preview session of a game. When the game is first loaded, it renders various graphics needed by the game, which takes time. While the game generates this in-game data, it presents an animated pinwheel graphic. Once the game is ready, it presents a short looping video of an in-game character overlaid by button labeled "play now" and another button labeled "buy now." The host server 570 presents this game to a number of client devices without pre-cueing the game, and uses these presentations to identify a game load latency, e.g., using the method 900 described above in reference to FIG. 9. For example, the host server 570 may determine a distribution for when client devices report a first interaction event, examine screenshots corresponding to the game display state for a sub-set of incidents where the first interaction event is at a time that is at the 80% percentile on the distribution (give or take a range of 2 seconds), and determine an average time for interactions in the sub-set that correspond to a tap on the button labeled with the word "play" (which is recognized by the host server 570 using OCR), while omitting the interactions corresponding to taps elsewhere, e.g., on the button labeled "buy now." This average time represents an estimated game load latency and can be used as a cue point. The host server 570 then executes the game on a virtual machine without a client device, and suspends the execution at the cue point, e.g., using the method 700 described above in reference to FIG. 7. The host server 570 uses the suspended instance to provide the game responsive to subsequent client requests. If the cue point is around 10 seconds into the game, then providing the game from an instance suspended at the cue point saves 10 seconds on each presentation. A client device user benefits by not spending those 10 seconds watching a pinwheel. If a preview session is time-limited, at say 30 seconds, then those 30 seconds can be used to engage with the game, rather than a third of them spent waiting for the game to load.

In at least one aspect, a client simulation server comprising a memory, a network interface, and a processor can be configured as described. In particular, in some implementations, the processor is configured to execute a simulation of a client device, and execute an application in the simulation of the client device up to a cue point. The processor is configured to suspend execution of the application at the cue point and store, in the memory, a representation of the application in a suspended execution state, suspended at the cue point. The client simulation server is further configured to receive, from a client device via the network interface, a request to provide an interactive instance of the application. In response to the request, the processor is configured to execute, from the suspended execution state of the application, a resumed instance of the application using the representation stored in the memory, and provide, to the client device via the network interface, an output from the resumed instance of the application.

In some implementations of the client simulation server, the cue point is at a predetermined length of execution time. In some implementations of the client simulation server, the cue point is a presentation stage in which the application presents a user interaction option. In some implementations of a system including the client simulation server, the system further includes a simulation monitor configured to detect presentation of the user interaction option. In some implementations, the simulation monitor is configured to detect presentation of the user interaction option using optical character recognition. In some implementations, the simulation monitor is configured to detect presentation of the user interaction option using machine learning computer vision. In some implementations, the processor of the client simulation server is configured to suspend execution of the application at the cue point by suspending execution of the simulation of the client device at the cue point.

In at least one aspect, a system is described that includes the client simulation server and further includes a monitor configured to monitor a plurality of sampling instances provided by the client simulation server to a respective plurality of different client devices, each sampling instance associated with an initial load state. The monitor is configured to identify, for each of the plurality of sampling instances, a corresponding length of time from the respective initial load state to a respective initial user interaction, and determine the predetermined length of execution time for the cue point based on the identified lengths of time. In some implementations, the monitor includes a processor configured to execute instructions to monitor the plurality of sampling instances, identify lengths of time, and determine the cue point based on the identified lengths of time. In some implementations, the system is configured to determine the predetermined length of execution time for the cue point using an arithmetic mean of the identified lengths of time. In some implementations, the system is configured to determine the predetermined length of execution time for the cue point using a trimmed mean of the identified lengths of time.

In some implementations, the processor of the client simulation server is configured to receive, from the client device via the network interface, a client device characteristic descriptor. The processor is configured to select a client simulation for a generalized client device with a characteristic conforming to the client device characteristic descriptor, and execute the simulation of the client device using the client simulation for the generalized client device.

In at least one aspect, a method is described that includes executing, by a client simulation system comprising a processor, a simulation of a client device, and executing, by the client simulation system, an application in the simulation of the client device up to a cue point. The method includes suspending execution of the application at the cue point and storing, in a memory associated with the client simulation system, a representation of the application in a suspended execution state, suspended at the cue point. The method includes receiving, from a client device via a network, a request to provide an interactive instance of the application. The method includes executing, by the client simulation system, from the suspended execution state of the application, a resumed instance of the application responsive to the request using the representation stored in the memory, and providing, to the client device via the network, an output from the resumed instance of the application.

In at least one aspect, a system is described for a simulation host server that includes a memory, a network interface, and a processor, the processor configured to execute an application on a simulation of a client device, where execution of the application causes the simulation to generate a media stream of application output data. The processor is configured to transmit the generated media stream to the client device via the network interface. The processor is further configured to provide a messaging interface to the application executing on the simulation of the client device, and to transmit, to the client device via the network interface, a first message received from the application at the messaging interface. The processor is configured to receive, via the network interface, a second message from the client device, and provide the second message received from the client device to the application executing on the simulation of the client device. In some implementations, the second message received from the client device is responsive to the first message transmitted to the client device. In some implementations, the first message transmitted to the client device is an access request. In some implementations, the access request causes the client device to display an authorization screen, process an authorization, and, responsive to the processed authorization, provide an access granted indicator to the simulation host server in the second message received from the client device.

In some implementations, the simulation host server includes a virtual machine host configured to provide the simulation of the client device as a virtual machine. In some implementations, the simulation of the client device includes a graphics output buffer for image data generated by the application, the processor further configured to generate the media stream using data from the graphics output buffer. In some implementations, the processor is configured to transmit the first message to a controller application executed at the client device, and to receive the second message from the controller application executed at the client device. In some implementations, the second message received from the client device is responsive to the first message transmitted to the client device. In some implementations, the first message causes the controller application executed at the client device to transmit device-specific data to the simulation host server. For example, in some implementations, the first message includes a uniform resource locater (URL) that the client device requests, causing the client device to transmit device-specific data.

In some implementations of the system, the first message transmitted to the client device is an access request for one of: access to system configuration data on the client device; access to an audio sensor on the client device; access to an image sensor on the client device; access to a biometric sensor on the client device; access to a light emitting diode on the client device; access to a parental control setting on the client device; or access to a file system on the client device. In some implementations, the access request causes the client device to display an authorization screen, process an authorization, and, responsive to the processed authorization, provide an access granted indicator to the simulation host server in the second message received from the client device.

FIG. 10 is a block diagram of an example computing system 101. The example computing system 101 is suitable for use in implementing the computerized components described herein, in accordance with an illustrative implementation. In broad overview, the computing system 101 includes at least one processor 107 for performing actions in accordance with instructions and one or more memory devices 106 or 109 for storing instructions and data. The illustrated example computing system 101 includes one or more processors 107 in communication, via a bus 105, with memory 106, at least one network interface controller 112 and network interface 111 for connection to a network device 114 (e.g., for access to a network 110), and other components 103, e.g., input/output (I/O) components 102. Generally, a processor 107 will execute instructions received from memory (e.g., cache 109 or memory 106). For example, the illustrated processor 107 incorporates, or is directly connected to, cache 109. In some instances, instructions are read from memory 106 into cache 109 and executed by the processor(s) 107 from cache 109. In some implementations, instructions are encoded in read only memory (ROM), not shown.

In more detail, the processor(s) 107 may be any logic circuitry that processes instructions, e.g., instructions fetched from the memory 106 or cache 109. The computing system 101 may be based on any processor, or set of processors, capable of operating as described herein. The processor(s) 107 may be single core or multi-core processor(s). The processor(s) 107 may be multiple distinct processors. For example, in some implementations, a general purpose processor 107 may be augmented with one or more special purpose processors 107, such as a math co-processor or a graphics processor. In some implementations, the processor(s) 107 are implemented as circuitry on one or more "chips."

The memory 106 may be any device suitable for storing computer readable data. The memory 106 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto-optical disks, and optical discs (e.g., CD ROM, DVD-ROM, or BLU-RAY discs). A computing system 101 may have any number of memory devices 106.

The cache 109 is generally a form of computer memory placed in close proximity to a processor 107 for fast access times. In some implementations, the cache 109 is memory circuitry that is part of, or on the same chip as, a processor 107. In some implementations, there are multiple levels of cache 109, e.g., L2 and L3 cache layers. In some implementations, multiple processors 117, and/or multiple cores of a processor 117, share access to the same cache 109.

The network interface controller 112 manages data exchanges via the network interface 111 (sometimes referred to as a network interface port). The network interface controller 112 handles the physical and data link layers of the Open Systems Interconnection (OSI) model for network communication. In some implementations, some of the network interface controller's tasks are handled by one or more of the processor(s) 107. In some implementations, the network interface controller 112 is incorporated into the processor 107, e.g., as circuitry on the same chip. In some implementations, a computing system 101 has multiple network interfaces 111 controlled by a single controller 112. In some implementations, a computing system 101 has multiple network interface controllers 112. In some implementations, each network interface 111 is a connection point for a physical network link (e.g., a cat-5 Ethernet link). In some implementations, the network interface controller 112 supports wireless network connections and an interface 111 is a wireless (e.g., radio) receiver/transmitter (e.g., for any of the IEEE 802.11 protocols, near field communication "NFC", BLUETOOTH, BLE, ZIGBEE, ANT, or any other wireless protocol). In some implementations, the network interface controller 112 implements one or more network protocols such as Ethernet. Generally, a computing system 101 exchanges data with other computing devices via physical or wireless links through a network interface 111. The network interface 111 may link directly to another device or to another device via an intermediary device, e.g., a network device such as a hub, a bridge, a switch, or a router, connecting the computing system 101 to a data network 110 such as the Internet.

The computing system 101 may include, or provide interfaces for, one or more input or output (I/O) components 102. Input devices include, without limitation, keyboards, microphones, touch screens, foot pedals, sensors, Musical Instrument Digital Interface (MIDI) input devices, and pointing devices such as a mouse or trackball. Output devices include, without limitation, video displays, speakers, haptic feedback devices, refreshable Braille terminals, lights, MIDI output devices such as MIDI synthesizers, and two or three dimensional printers.

The other components 103 may include an I/O interface, external serial device ports, and any additional co-processors. For example, a computing system 101 may include an interface (e.g., a universal serial bus (USB) interface) for connecting input devices, output devices, or additional memory devices (e.g., portable flash drive or external media drive). In some implementations, a computing system 101 includes an additional device 103 such as a co-processor. For example, a math co-processor can assist the processor 107 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus (including, e.g., a processor 107). A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible. The computer storage medium stores data, e.g., computer-executable instructions, in a non-transitory form.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array (FPGA) or an application specific integrated circuit (ASIC). Such a special purpose circuit may be referred to as a computer processor even if it is not a general-purpose processor.

A user may opt in or out of allowing remote servers to identify and store information about the user and/or about devices operated by the user. For example, the user may opt in to receiving third-party content selected based on apparent relevance to the user. In some implementations, a device identifier is associated with a particular instance of a client application (e.g., running on client device 120). In some implementations, the user may be represented using a randomized device identifier (e.g., a cookie, a device serial number, etc.) that contains no personally-identifying information about the user. For example, information relating to the user's name, demographics, etc., may not be used by a remote server unless the user opts in to providing such information. Thus, the user has control over how information is collected about him or her and used by a remote server or other content source. Some information that may be associated with the user, or with an anonymized token representative of the user, may include events, such as one or more queries, one or more clicks, browser history data (e.g., the URLs visited, the number of URLs viewed, URL visit durations, etc.), etc.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A method comprising:
executing, by a client simulation system comprising a processor, a simulation of a client device, the simulation of the client device including a virtual application stack comprising a runtime layer and an operating framework;

executing, by the client simulation system, an application in the simulation of the client device, wherein the application generates (1) image data stored in the data storage, and (2) a request to access the runtime layer or the operating framework of the virtual application stack of the simulation of the client device;

transmitting, by the client simulation system, to a first client device via a network interface, a media stream generated using the image data stored in the data storage;

providing, by the client simulation system, responsive to the application generating the request to access the runtime layer or the operating framework, the request to the virtual application stack of the simulation of the client device;

intercept, using a messaging interface provided by the client simulation system to the simulation of the client device, the request to access the runtime layer or the operating framework of the virtual application stack;

transmitting, by the client simulation system, via the network interface, responsive to intercepting the request to access the runtime layer or the operating framework of the virtual application stack, the request- to a corresponding messaging interface forming part of a corresponding application stack of the first client device using the messaging interface, causing the first client device to:

access, using a corresponding operating framework or a corresponding runtime layer of the corresponding application stack, sensor information from sensors of the first client device via a hardware abstraction layer of the corresponding application stack;

generate a response to the request that includes the sensor information; and transmit, using the corresponding messaging interface, the response to the messaging interface of the simulation of the client device;

receiving, by the client simulation system, using the messaging interface for the simulation of the client device, from the first client device, the response to the request; and providing, by the client simulation system, to the application in the simulation of the client device, the sensor information included in the response received from the first client device.

2. The method of claim 1, the method further comprising transmitting, by the client simulation system, the request to a controller application executed at the first client device, the controller application incorporating the corresponding messaging interface of the first client device, and receiving the response to the request from the controller application executed at the first client device.

3. The method of claim 2, wherein the request, when received by the first client device, causes the controller application executed at the first client device to transmit device-specific data to the client simulation system.

4. The method of claim 3, wherein the request from the application to the simulation of the client device intercepted by the messaging interface includes an access request for one of:

access to system configuration data on the client device;
access to an audio sensor on the client device;
access to an image sensor on the client device;
access to a biometric sensor on the client device;
access to a light emitting diode on the client device;
access to a parental control setting on the client device; or
access to a file system on the client device.

5. The method of claim 4, wherein the request to access content the runtime layer or the operating framework of the virtual application stack further causes the client device to display an authorization screen, process an authorization, and, responsive to processing the authorization, provide an access granted indicator to the client simulation system.

6. The method of claim 4, wherein the request, when transmitted using the messaging interface, includes a uniform resource locator (URL) configured to cause the controller application executed at the client device to transmit the device-specific data to the client simulation system.

7. The method of claim 2, comprising:

receiving, from the first client device via the network, a client device characteristic descriptor;

selecting a client simulation for a generalized client device with a characteristic conforming to the client device characteristic descriptor; and executing the simulation of the client device using the client simulation for the generalized client device.

8. A non-transitory computer-readable medium storing instructions that cause a processor executing the instructions to:

execute a simulation of a client device, the simulation of the client device including a virtual application stack comprising a runtime layer and an operating framework;

execute an application in the simulation of the client device, the application generating (1) image data stored in the data storage, and (2) a request to access the runtime layer or the operating framework of the virtual application stack of the simulation of the client device;

transmit, to a first client device via a network interface, a media stream generated using the image data stored in the data storage;

provide, responsive to the application generating the request to access the runtime layer or the operating framework, the request to the virtual application stack of the simulation of the client device;

intercept, using a messaging interface provided by the processor to the simulation of the client device, the request to access the runtime layer or the operating framework of the virtual application stack;

transmit, via the network interface, responsive to intercepting the request to access the runtime layer or the operating framework of the virtual application stack, the request to a corresponding messaging interface forming a part of a corresponding application stack of the first client device using the messaging interface, causing the first client device to:

access sensor information from sensors of the first client device via a hardware abstraction layer of the corresponding application stack;

generate a response to the request that includes the sensor information; and transmit, using the corresponding messaging interface, the response to the messaging interface of the simulation of the client device;

receive, using the messaging interface for the simulation of the client device, from the first client device via the network interface, the response to the request; and provide, to the application in the simulation of the client device, the sensor information included in the response received from the first client device.

9. The non-transitory computer-readable medium of claim 8 storing the instructions that cause the processor executing the instructions to transmit the request to a controller application executed at the first client device, the controller application incorporating the corresponding messaging interface of the first client device, and to receive the response to the request from the controller application executed at the first client device.

10. The non-transitory computer-readable medium of claim 9, wherein the request, when received by the first client device, causes the controller application executed at the first client device to transmit device-specific data to the processor.

11. A system comprising:
a client simulation server comprising a memory, a network interface, and a processor,
the processor configured to:
execute a simulation of a client device, the simulation of the client device including a virtual application stack comprising a runtime layer and an operating framework;
execute an application in the simulation of the client device, the application generating (1) image data stored in the data storage, and (2) a request to access the runtime layer or the operating framework of the virtual application stack of the simulation of the client device;
transmit, to a first client device via the network interface, a media stream generated using the image data stored in the data storage;
provide, responsive to the application generating the request to access the runtime layer or the operating framework, the request to the virtual application stack of the simulation of the client device;
intercept, using a messaging interface provided by the client simulation server to the simulation of the client device, the request to access the runtime layer or the operating framework of the virtual application stack;
transmit, via the network interface, responsive to intercepting the request to access the runtime layer or the operating framework of the virtual application stack, the request to a corresponding messaging interface forming a part of a corresponding application stack of the first client device using the messaging interface, causing the first client device to:
access sensor information from sensors of the first client device via a hardware abstraction layer of the corresponding application stack;
generate a response to the request that includes the sensor information; and
transmit, using the corresponding messaging interface, the response to the messaging interface of the simulation of the client device;
receive, using the messaging interface for the simulation of the client device, from the first client device via the network interface, the response to the request; and
provide, to the application in the simulation of the client device, the sensor information included in the response received from the first client device.

12. The system of claim 11, wherein the processor is further configured to transmit the request to a controller application executed at the first client device, the controller application incorporating the corresponding messaging interface of the first client device, and to receive the response to the request from the controller application executed at the first client device.

13. The system of claim 12, wherein the request, when received by the first client device, causes the controller application executed at the first client device to transmit device-specific data to the client simulation server.

14. The system of claim 11, wherein the request provided from the application to the simulation of the client device intercepted by the messaging interface includes an access request for one of:
access to system configuration data on the client device;
access to an audio sensor on the client device;
access to an image sensor on the client device;
access to a biometric sensor on the client device;
access to a light emitting diode on the client device;
access to a parental control setting on the client device; or
access to a file system on the client device.

15. The system of claim 14, wherein the request to access the runtime layer or the operating framework of the virtual application stack further causes the client device to display an authorization screen, process an authorization, and, responsive to processing the authorization, provide an access granted indicator to the client simulation server.

16. The system of claim 13, wherein the request, when transmitted using the messaging interface, includes a uniform resource locator (URL) configured to cause the controller application executed at the client device to transmit the device-specific data to the client simulation server.

17. The system of claim 11, wherein the processor of the client simulation server is further configured to suspend execution of the application at a cue point by suspending execution of the simulation of the client device at the cue point.

18. The system of claim 11, wherein the processor of the client simulation server is further configured to:
receive, from the first client device via the network interface, a client device characteristic descriptor;
select a client simulation for a generalized client device with a characteristic conforming to the client device characteristic descriptor; and
execute the simulation of the client device using the client simulation for the generalized client device.

* * * * *